United States Patent
Trevino et al.

(10) Patent No.: US 12,521,316 B2
(45) Date of Patent: Jan. 13, 2026

(54) PILL CASE AND MEDICATION REMINDER SYSTEM

(71) Applicant: Fresenius Medical Care Holdings, Inc., Waltham, MA (US)

(72) Inventors: Samuel Trevino, San Ramon, CA (US); Daniel L Sloat, Wakefield, MA (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 326 days.

(21) Appl. No.: 18/077,848

(22) Filed: Dec. 8, 2022

(65) Prior Publication Data

US 2024/0189192 A1    Jun. 13, 2024

(51) Int. Cl.
| | | |
|---|---|---|
| *A61J 7/00* | (2006.01) | |
| *A61J 7/02* | (2006.01) | |
| *A61J 7/04* | (2006.01) | |
| *G08B 21/24* | (2006.01) | |
| *G16H 20/13* | (2018.01) | |

(Continued)

(52) U.S. Cl.
CPC ........... *A61J 7/0418* (2015.05); *A61J 7/0076* (2013.01); *A61J 7/02* (2013.01); *G08B 21/24* (2013.01); *G16H 20/13* (2018.01); *H04W 4/023* (2013.01); *H04W 4/027* (2013.01); *H04W 4/029* (2018.02)

(58) Field of Classification Search
CPC ........ G16H 20/13; A61J 7/0418; A61J 7/0076
See application file for complete search history.

(56) References Cited

U.S. PATENT DOCUMENTS

| | | | | |
|---|---|---|---|---|
| 7,330,101 B2 * | 2/2008 | Sekura | ................... | G16H 20/10 368/10 |
| 7,715,277 B2 * | 5/2010 | de la Huerga | ... | G06K 19/07762 340/572.1 |

(Continued)

FOREIGN PATENT DOCUMENTS

| | | |
|---|---|---|
| CN | 204233434 U | 4/2016 |
| CN | 206566212 U | 10/2017 |

OTHER PUBLICATIONS

Jitu Bhaskar, How to Develop a Pill Reminder or Medication Tracker App?, Mar. 16, 2022, https://semidotinfotech.com/blog/how-to-develop-a-pill-reminder-medication-tracker-app/.

(Continued)

*Primary Examiner* — Gene O Crawford
*Assistant Examiner* — Ayodeji T Ojofeitimi
(74) *Attorney, Agent, or Firm* — Kilyk & Bowersox, P.L.L.C.

(57) ABSTRACT

A pill case and medication reminder system is provided. A pill case and a reminder system are in data transfer communication with one another. The system can also include a global positioning system, an accelerometer, or both. A pill case compartment is configured to hold a medication. The pill case has a sensor or sensor array configured to detect the amount of medication in the pill case. A pill case processor is configured to generate a data signal pertaining to the amount of medication in the pill case. The system can generate medication reminders, for example, pertaining to refilling a subscription or taking medication with food. The pill case can include or connect to a phone case for a smartphone, or can be integrated into a smartwatch.

9 Claims, 16 Drawing Sheets

(51) Int. Cl.
*H04W 4/02* (2018.01)
*H04W 4/029* (2018.01)

(56) References Cited

U.S. PATENT DOCUMENTS

| | | | |
|---|---|---|---|
| 11,348,399 | B1 | 5/2022 | Sanso et al. |
| 11,450,196 | B2 | 9/2022 | Daoura et al. |
| 2005/0133383 | A1* | 6/2005 | Lyon ................. A45C 11/24 206/37 |
| 2012/0187142 | A1* | 7/2012 | Flowers ............. A61J 7/0409 221/7 |
| 2015/0191296 | A1* | 7/2015 | Umentum .......... B65D 83/0805 221/26 |
| 2015/0274402 | A1 | 10/2015 | Elliott |
| 2016/0042150 | A1* | 2/2016 | Moloughney ......... G16H 20/13 700/237 |
| 2016/0107820 | A1* | 4/2016 | Macvittie ............. A61J 7/0472 221/13 |
| 2016/0150920 | A1* | 6/2016 | Oliveira ............... G06F 1/1626 222/206 |
| 2017/0119628 | A1* | 5/2017 | Geboers .............. A61J 7/0418 |
| 2017/0220772 | A1* | 8/2017 | Vleugels .............. G16H 50/70 |
| 2018/0000692 | A1 | 1/2018 | Born et al. |
| 2019/0142698 | A1* | 5/2019 | Bukstein ................ G01F 15/00 221/1 |
| 2019/0392934 | A1 | 12/2019 | Tabakin |
| 2020/0085694 | A1 | 3/2020 | Patel et al. |
| 2020/0193806 | A1* | 6/2020 | Finke ..................... H04L 67/12 |
| 2020/0206084 | A1 | 7/2020 | Tsukanov |
| 2021/0283019 | A1 | 9/2021 | Nelson |
| 2022/0160585 | A1 | 5/2022 | Stein et al. |

OTHER PUBLICATIONS

M. Hayakawa, et al., A Smartphone-based Medication Self-management System with Real-time Medication Monitoring, Jan. 30, 2013, Applied Clinical Informatics, 2013; 4: 37-52.

Murtadha Aldeer, et al., A Review of Medication Adherence Monitoring Technologies, May 6, 2018, Applied System Innovation, 2018, 1, 14; MDPI.

Adam Richert, Developing a Portable System for Medicine Dosage, KTH Royal Institute of Technology, Stockholm, Sweden 2018.

International Search Report for corresponding Application No. PCT/US2023/033387, dated Jan. 16, 2024, four pages.

Written Opinion of the International Searching Authority for corresponding Application No. PCT/US2023/033387, dated Jan. 16, 2024, five pages.

* cited by examiner

PILL CASE AND MEDICATION REMINDER SYSTEM

FIELD

The present invention relates generally to medication reminder systems and medication containers.

BACKGROUND

It is important for many dialysis patients to ingest medicine such as binders into their diets. The best time for ingesting the medicine can be before, during, or after eating. It would be desirable to provide a medication reminder system that correlates issuing reminders with eating schedules and habits.

SUMMARY

It is an object of the present invention to provide a medication reminder system that issues reminders to take a medication based on a sensed activity.

It is an object of the present invention to provide a medication reminder system that issues reminders to take a medication based on an eating activity or based on an activity associated with a perceived eating event.

It is an object of the present invention to provide a medication reminder system that issues reminders to take a medication based on a location, movement, or both.

It is an object of the present invention to provide a medication reminder system that issues reminders to take a medication based on a time of day.

It is an object of the present invention to provide a medication reminder system that issues reminders to replenish a medication and/or refill a prescription.

These and other objects of the present invention are achieved according to the invention by a pill case and medication reminder system comprising a pill case, a reminder system in data transfer communication with the pill case, and a global positioning system in data transfer communication with the reminder system. The pill case can comprise a compartment configured to hold a medication. The pill case can comprise a sensor configured to detect the amount of medication in the pill case. The pill case can comprise a pill case processor configured to generate a data signal pertaining to the amount of medication in the pill case. The pill case can comprise a pill case transmitter configured to transmit the data signal to the reminder system. The pill case can comprise a hard shell, a clam shell, a soft pouch, a hip pack, a purse, or the like. The pill case can include one or more features that enables the pill case to communicate with the user. The pill case can include one or more of a screen, a touch screen, a speaker, a vibration generator, a light, a flashing light, an LED light, a user interface, or the like. The pill case can be configured to send a text message to the user. The pill case can include a trackable or detectable component so that the pill case can be located, for example, by using a find-my-phone app or similar find-my technology. Cell tower signal triangulation can be used to find the pill case. BLUETOOTH technology, available from Bluetooth SIG, Inc. of Kirkland, Washington, can be used to find the pill case. BLUETOOTH is a registered U.S. trademark of Bluetooth SIG, Inc. of Kirkland, Washington. A combination of cell tower signal triangulation and BLUETOOTH technology can be used to find the pill case. Cell tower signal triangulation can be used for long-range finding of the pill case whereas BLUETOOTH technology can be used for short-range finding of the pill case. Technology such as AIR TAG (available from Apple, Cupertino, California) or TILE TRACKER (available from Tile, San Mateo, California) can be used to find the pill case and a tracking device can be integrated into, or added to, the pill case. The pill case can include pairing technology so that it can be paired with a smartphone, a smartwatch, a smart tablet, or another type of reminder system. BLUETOOTH technology can be used.

The global positioning system can comprise a global positioning signal receiver, a positioning processor, and a positioning transmitter. The global positioning signal receiver can be configured to receive global positioning signals. The positioning processor can be configured to generate a position signal based on received global positioning signals. The position signal can be a position coordinate signal, a position ordinate signal, a position tri-ordinate signal, or the like. The positioning transmitter can be configured to transmit the position coordinate signal to the reminder system. The global positioning system can be integrated or otherwise a part of a smartphone or smartwatch or can be separate and independent from the pill case, the reminder system, neither, or both. The global positioning system can enable the pill case and reminder system to create a dynamic ecosystem that provides situational awareness, spatial relatedness, lost component tracking and finding, and the like.

The reminder system can comprise at least one receiver and a system processor. The at least one receiver can be configured to receive the data signal from the pill case transmitter. The at least one receiver can be configured to receive the position signal from the global positioning system. The system processor can be programmed to generate alerts pertaining to the medication, based on the data signal and the position signal.

The present invention also provides a pill case and medication reminder system that comprises a pill case, a reminder system in data transfer communication with the pill case, and an accelerometer in data transfer communication with the reminder system. The accelerometer can comprise an accelerometer sensor, an accelerometer processor, and an accelerometer transmitter. The accelerometer sensor can be configured to sense acceleration of motion of the reminder system. The accelerometer processor can be configured to generate an accelerometric signal based on the sensed acceleration of motion. The accelerometer transmitter can be configured to transmit the accelerometric signal to the reminder system. The reminder system receiver and processor can be to receive a data signal from the pill case transmitter and to receive an accelerometric signal from the accelerometer. The reminder system processor can be programmed to generate alerts pertaining to the medication, based on the data signal and the accelerometric signal.

BRIEF DESCRIPTION OF THE DRAWINGS

The present invention may be more fully understood with reference to the attached drawings that form a part of the present disclosure. The drawings are intended to exemplify, not limit, the invention.

DETAILED DESCRIPTION

Figure 1A:
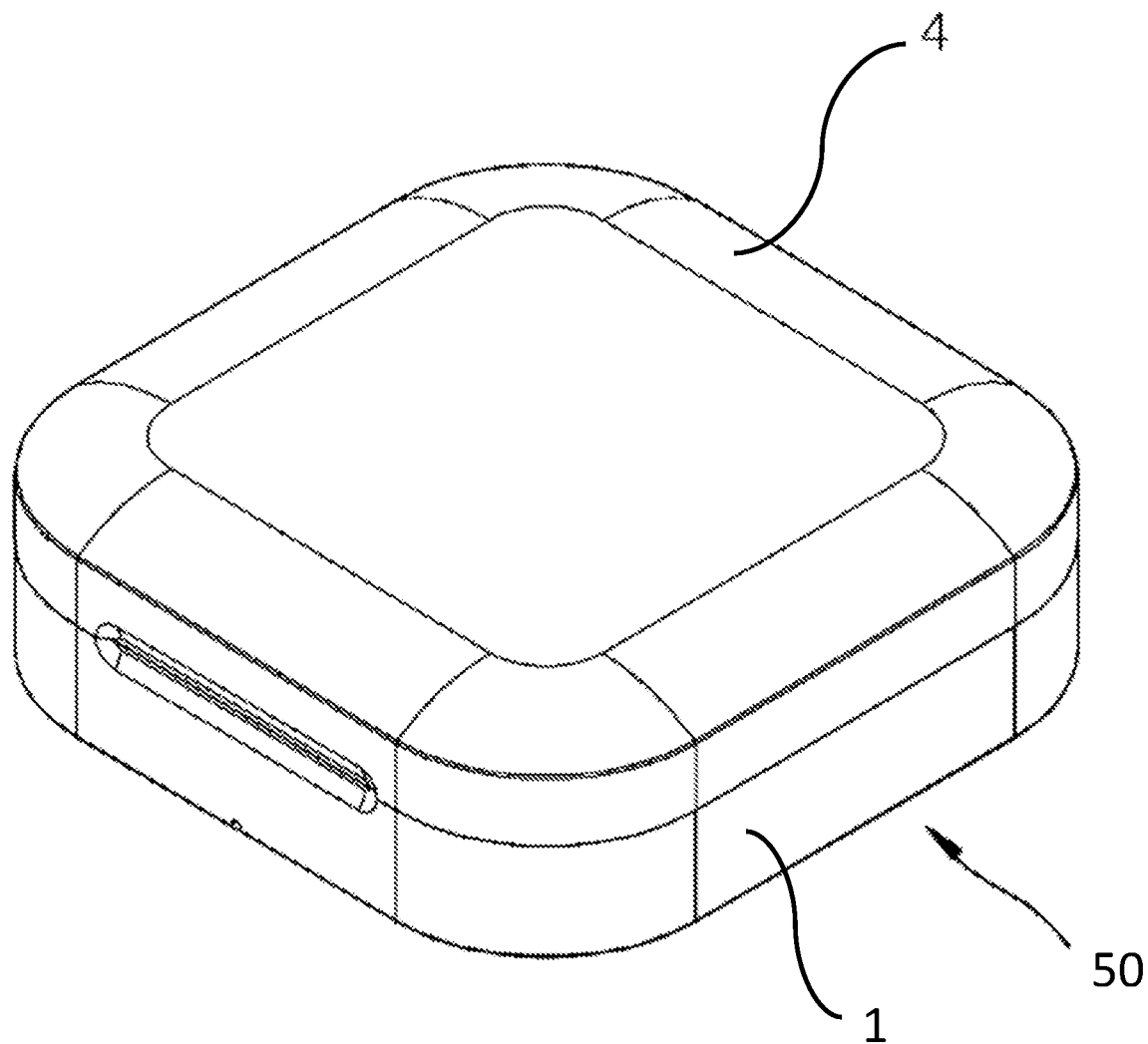
FIG. 1A is a perspective view of a smart pill case according to an embodiment of the present invention.

According to various embodiments of the present invention, a pill case and medication reminder system is provided. The system includes a pill case, a reminder system in data transfer communication with the pill case, and a global positioning system in data transfer communication with the reminder system. The pill case can comprise a compartment configured to hold a medication, for example, pills. The pill case can have a sensor configured to detect the amount of medication in the pill case, for example, the number of pills in the pill case. The sensor can comprise a sensor array, a sensor matrix, a sensor pattern, a combination thereof, or the like. A pill counter system can be included. A pill case processor can be included in, on, or in connection with the pill case. The pill case processor can be configured to generate a data signal pertaining to the amount of medication in the pill case. The pill case processor can be configured to generate a display indicating the amount of medication in the pill case. A pill case transmitter can also be included in, on, or in connection with the pill case and can be configured to transmit the data signal to the reminder system. The pill case can comprise a phone case for a smartphone or a case for a smartwatch, or can be integrated into a smartphone or into a smartwatch. The pill case can be integrated into a watch band connected to a smartwatch. The pill case can include a display. The display can additionally, or instead, include a display screen built into glasses, for example, a smart-glasses display or a smart goggles display. The pill case can include an augmented reality display, for example, a computer-generated projection or image or icon of the contents of the pill case, a level icon indicating the amount of medication in the pill case, a "refill-needed" icon, or the like. Instead of, or in addition to, a display, auditory reminders, alerts, recommendations, and the like can be generated, for example, through a pill case speaker, a smartphone speaker, through ear buds, or a combination thereof.

The global positioning system can comprise a global positioning signal receiver, a positioning processor, and a positioning transmitter. The global positioning signal receiver can be configured to receive global positioning signals, for example, from global positioning satellites. The positioning processor can be configured to generate a position coordinate signal based on received global positioning signals. The positioning transmitter can be configured to transmit the position coordinate signal to the reminder system. The global positioning system can be used to determine a user's proximity to a location, for example, a pharmacy or a restaurant. The global positioning system can be used to determine an approach vector, for example, to let a user know as the user gets closer and closer to a target or potential target location. Timing and approach vector data can be combined in determining whether an alert should be generated. Artificial intelligence can be used to analyze data such as time-of-day and approach vector data, to compare that data with recognized patterns and behaviors, and to determine whether an alert should be generated or a report should be sent.

The reminder system can comprise at least one receiver and a system processor. The at least one receiver can be configured to receive a data signal from the pill case transmitter and to receive a position coordinate signal from the global positioning system. The system processor can be programmed to generate alerts pertaining to the medication, based on the data signal and the position coordinate signal. The reminder system can comprise a software program stored on a smartphone, on a smartwatch, on a computer tablet, on a computer, or the like. For example, the reminder system can comprise an app stored on a smartphone. The reminder system can comprise a stand-alone unit, separate and apart from a smart phone or smartwatch. The stand-alone unit can have an integrated pill case or can be separate from the pill case. The stand-alone unit can clip onto a belt, strap, or clothing. The stand-alone unit can be of a size, shape, and/or footprint similar to, or the same as, a pager or a pocket-watch. The reminder system can communicate with a pharmacist, with a doctor, with a nurse, with a care giver, with a dietician, or the like. Reports can be generated, stored, and forwarded. For example, a report can be sent to a dietician reorting whether a user has been taking medication properly and timely. Cloud computing can be used. The reminder system, pill case, or both can communicate through cloud computing with a pharmacist, with a doctor, with a nurse, with a care giver, with a dietician, or the like. Reports can be generated, stored, and forwarded via cloud computing. By tracking the user's behavior including, for example, the user's medication taking regiment, a digital twin or model of the user can be generated, saved, and forwarded or reported, for example, to a care team, digital nurse, or the like.

The reminder system, system processor can be configured to generate a low inventory alert when the amount of medication in the pill case falls below a predetermined level. The positioning processor can be configured to compare a position coordinate signal with a map database, and to determine a proximity of the global positioning system to (1) a restaurant or restaurant district, (2) a drugstore or pharmacy, or (3) both a restaurant or restaurant district and a drugstore or pharmacy. The system processor can be configured to generate a medication reminder alert when the position coordinate signal indicates that the global positioning system is within a certain, predetermined, and/or preset distance of a restaurant or a restaurant district, for example, within 3000 feet, within 2000 feet, within 1000 feet, within 500 feet, within 250 feet, or the like. The system processor can be configured to generate a medication reminder alert when the position coordinate signal indicates that the global positioning system is inside of a restaurant.

The system processor can be configured to generate a low inventory alert when a data signal pertaining to an amount of medication in the pill case indicates that the amount of medication in the pill case is below a predetermined level, and the position coordinate signal indicates that the global positioning system is within a certain, predetermined, and/or preset distance of a drug store or pharmacy, for example, within 5000 feet of a drug store or pharmacy, within 3000 feet, within 2000 feet, within 1000 feet, within 500 feet, or the like. The system processor can be configured to generate a low inventory alert when the data signal pertaining to the amount of medication in the pill case indicates that the amount of medication in the pill case is below a predetermined level, and the position coordinate signal indicates that the global positioning system is within a drug store or pharmacy.

The pill case and medication reminder system can further comprise a timer configured to generate a timing signal. The timer can be incorporated into the pill case, into the reminder system, into the global positioning system, or into a combination thereof. More than one timer can be included. The system processor can be configured or programmed to generate alerts based on the timing signal or based also on the timing signal. The pill case and medication reminder system can further comprise a memory having a meal-time time range stored therein, and the system processor can be programmed to generate a medication reminder alert when the timing signal and the position coordinate signal indicate that the reminder system is on-the-move during the meal-time time range.

The reminder system can further comprise a timer and the pill case processor can be configured to generate a timing signal pertaining to a time when an amount of medication is removed from the pill case. The system processor can be configured to generate a first medication reminder alert at a first time of day. The reminder system can be configured to cancel the first medication reminder alert when the timing signal indicates that the medication has been timely taken prior to the first time of day. Multiple time-of-day alerts can be programmed or otherwise set and can be cancelled as appropriate when the pill case processor timely generates a medication-removed-from-pill-case timing signal as each time-of-day alert time approaches.

According to yet other various embodiments of the present invention, a pill case and medication reminder system is provided that comprises a pill case, a reminder system, and an accelerometer. The reminder system can be in data transfer communication with the pill case. The accelerometer can be in data transfer communication with the reminder system. The pill case can comprise a compartment configured to hold a medication, for example, pills, and a sensor configured to detect the amount of medication in the pill case. A pill counter system can be included. The pill case can include a pill case processor configured to generate a data signal pertaining to the amount of medication in the pill case. The pill case can include a pill case transmitter configured to transmit the data signal to the reminder system. The pill case can include a display. The display can additionally, or instead, include a display screen built into glasses, for example, a smart-glasses display or a smart goggles display. The pill case can include an augmented reality display, for example, a display that generates a computer-generated projection or image or icon of the contents of the pill case, a level icon indicating the amount of medication in the pill case, a "refill-needed" icon, or the like.

The accelerometer can comprise an accelerometer sensor, an accelerometer processor, and an accelerometer transmitter. The accelerometer sensor can be configured to sense acceleration of motion of the reminder system. The accelerometer processor can be configured to generate an accelerometric signal based on the sensed acceleration of motion. The accelerometer transmitter can be configured to transmit the accelerometric signal to the reminder system.

The reminder system can comprise at least one receiver and a system processor. The at least one receiver can be configured to receive the data signal from the pill case transmitter and to receive the accelerometric signal from the accelerometer. The system processor can be programmed to generate alerts pertaining to the medication, based on the data signal and the accelerometric signal. The pill case can comprise a medication container separate and apart from the accelerometer.

The system processor can be configured to generate a medication reminder alert when the accelerometric signal indicates that the reminder system, the accelerometer, or both, are moving in a manner that indicates an eating motion, herein referred to as an eating gesture. When the pill case and reminder system determines, based on an accelerometric signal, that the user is eating, a reminder alert can be sent, if appropriate, reminding the user, for example, that medications should be taken with food, that medication should be taken before, during, or after eating, a combination thereof, or the like.

The pill case processor can be configured to generate a display indicating the amount of medication in the pill case. A pill case transmitter can also be included in, on, or in connection with the pill case and can be configured to transmit the data signal to the reminder system. The pill case can comprise a phone case for a smartphone or a case for a smartwatch, or can be integrated into a smartphone or into a smartwatch. The pill case can be integrated into a watch band connected to a smartwatch. The pill case can include a display. The pill case can include an augmented reality display, for example, a computer-generated projection or image or icon of the contents of the pill case, a level icon indicating the amount of medication in the pill case, a "refill-needed" icon, or the like. The pill case and reminder system can include software that enables an augmented reality display. The augmented reality display can show the relative spatial positioning of the system components and user, icons, images, layered images, layered icons, that can augment real-time photographs and video with virtual aspects. An augmented reality display can be provided separately from the pill case, for example, as part of the reminder system, or integrated in smart goggles or smart glasses.

The reminder system can comprise a software program stored on a smartphone, on a smartwatch, on a computer tablet, on a computer, or the like. For example, the reminder system can comprise an app stored on a smartphone. The pill case and reminder system can include a display and can be configured to show, on the display, system information, for example, the amount of medication in the pill case, an amount of accelerometric motion or activity, alert times, a daily total of medication taken, combinations thereof, and the like. The system processor can be configured to generate a low inventory alert when the amount of medication in the pill case falls below a predetermined level.

According to various embodiments of the present invention, the pill case and medication reminder system includes both an accelerometer as described above, and a global positioning system. The global positioning system can include a positioning processor that is configured to compare a position coordinate signal with a map database. The comparison can be used by the global positioning system to determine a proximity of the global positioning system to (1) a restaurant or restaurant district, (2) a drugstore or pharmacy, (3) a home, or any combination thereof. The system processor can be configured to generate a medication reminder alert when the position coordinate signal indicates that the global positioning system is within a certain distance of a restaurant or a restaurant district, for example, within 3000 feet, within 2000 feet, within 1000 feet, within 500 feet, or the like.

The system processor can be shared by the accelerometer, the global positioning system, the pill case, or a combination thereof. The system processor can be configured to generate a medication reminder alert when the accelerometric signal indicates that the reminder system, the accelerometer, or both, are moving in a manner that indicates an eating gesture. When the pill case and reminder system determines, based on an accelerometric signal, that the user is eating, a reminder alert can be sent, if appropriate, reminding the user, for example, that medications should be taken with food, that medication should be taken before, during, or after eating, a combination thereof, or the like.

The system processor can be configured to generate a low inventory alert when the data signal pertaining to the amount of medication in the pill case indicates that the amount of medication in the pill case is below a predetermined level, and the position coordinate signal indicates that the global positioning system is within a certain, predetermined, and/or preset distance of a drug store or pharmacy, for example, within 500 feet, within 2500 feet, within 1000 feet of, within 500 feet, or the like.

The pill case and medication reminder system, with accelerometer, can further comprise a timer configured to generate a timing signal. The system processor can be programmed to generate alerts, based on, or further based on, the timing signal. The pill case and medication reminder system can further comprise a memory having a meal-time time range stored therein. A memory can be included in the pill case, in the accelerometer, in the reminder system, or in a combination thereof. A cloud-based memory can be used. The system processor can be programmed to generate a medication reminder alert when the timing signal and the accelerometric signal indicate that the reminder system is in transport, is moving in an eating gesture, or both, during the meal-time time range.

The reminder system can further comprise a timer and the pill case processor can be further configured to generate a timing signal pertaining to a time when an amount of medication is removed from the pill case. The system processor can be configured to generate a first medication reminder alert at different times of day, for example, at a first time of day. The reminder system can be configured to cancel the first medication reminder alert when the timing signal indicates that the medication has been timely taken prior to the first time of day.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1B:
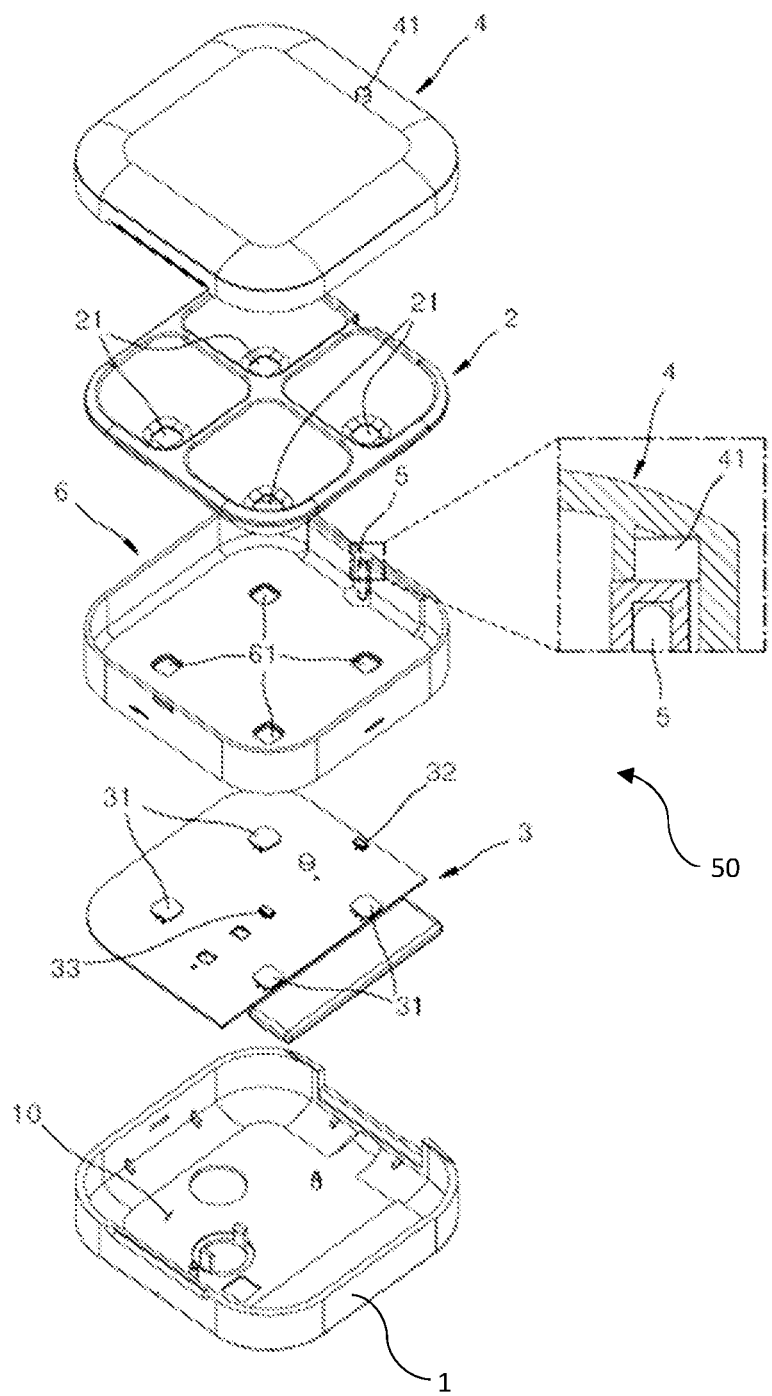
FIG. 1B is an exploded perspective view of the smart pill case shown in FIG. 1A according to an embodiment.
Figure 1C:
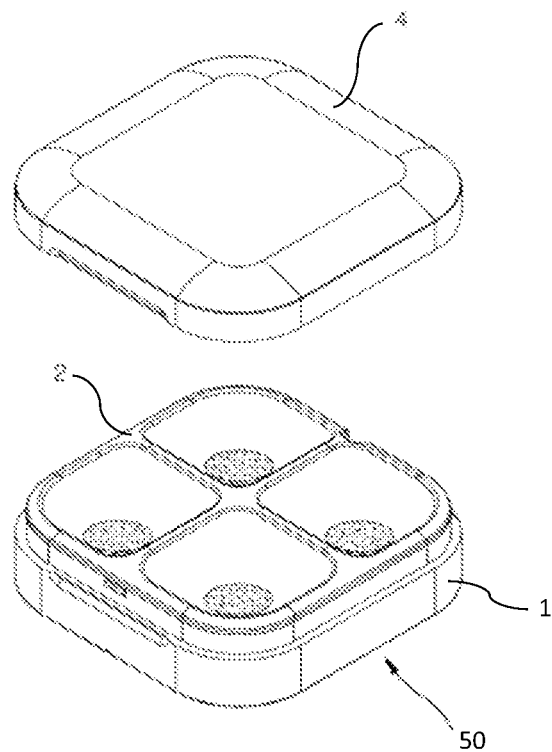
FIGS. 1C and 1D are views illustrating states of use of the smart pill case shown in FIGS. 1A and 1B.
Figure 1D:
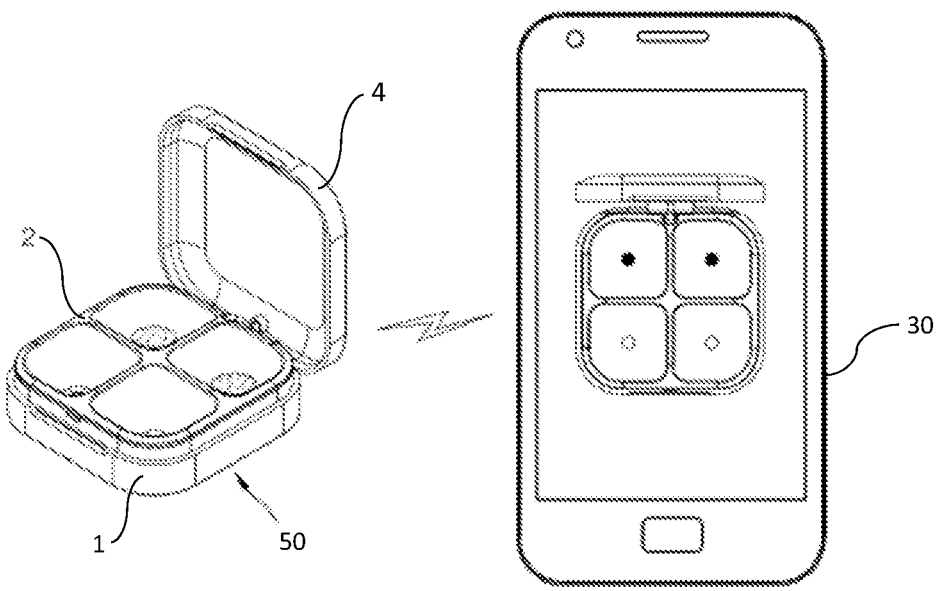

With reference to the drawing figures, a smart pill case according to an embodiment of the present invention will be described in detail. FIG. 1A is a perspective view of a smart pill case 50 according to an embodiment of the present invention. FIG. 1B is an exploded perspective view of smart pill case 50 shown in FIG. 1A. FIGS. 1C and 1D are views illustrating states of use of the smart pill case 50 shown in FIGS. 1A and 1B.

As shown in FIGS. 1A and 1B, a smart pill case 50 is shown according to an embodiment of the present invention. Smart pill case 50 can be utilized to inform a user of whether a correct dose of medicine or dietary supplement is carried with him or her, of whether the medicine or dietary supplement is taken at a predetermined time, of whether there is a need to obtain more medicine, and/or whether it is time to take a medication. The smart pill case can be used to make sure a user can have and take the correct dose of medicine or dietary supplement at an appropriate time during the day. Smart pill case 50 includes a main case 1, a medicine case 2, a circuit board 3, and a top cover 4. Smart pill case 50 can be configured to send text messages to a user, for example, reminders, recommendations, suggestions, alerts, and the like.

As shown in FIG. 1B, the main case 1 includes an accommodation space 10 provided in the case and having an openable top to store a component therein. Medicine case 2 is arranged in accommodation space 10 of main case 1 and includes medicine compartments to hold a substance to be taken, for example, a binder, another medicine, a dietary supplement, or the like. The plurality of medicine compartments of medicine case 2 are partitioned to separately accommodate various types of medicine and respectively include light-transmitting holes 21 through which light is transmitted. Light-transmitting holes 21 transmit light and are selectively opened and closed depending on whether a substance to be taken is placed in the medicine compartments, thereby enabling selective blocking of light transmission paths.

Circuit board 3 is configured to mount thereon components for monitoring whether a substance to be taken is held in a medicine compartment of medicine case 2 or whether a correct dose of the substance in the medicine compartment is taken at a predetermined time, and is arranged, as shown in FIG. 1B, between medicine case 2 and main case 1.

As an example, optical sensors 31 can be provided at positions corresponding to the respective light-transmitting holes 21, and a communication device (not shown) can be configured to transmit signals sensed by optical sensors 31 to a mobile terminal such as a smartphone. Optical sensors 31 can be mounted on circuit board 3.

Alternatively, or in addition, the medicine can be prepackaged in an electronically monitorable blister pack device, for example, the electronic monitoring device, or components thereof, described in U.S. Patent Application Publication No. US 2015/0274402 A1 to Elliott, which is incorporated herein by reference in its entirety. For example, a blister pack can be used that has a tray with one or more discrete cavities for receiving consumer products and a seal adhered to the tray to seal the one or more discrete cavities. The seal can be provided with a pattern of electrically conductive tracks that defines a circuit per cavity. The smart pill case can itself comprise a holder for supporting the blister pack in use, and an electronic module for monitoring the integrity of the circuits for dosage compliance, security, tamper detection, stock control, inventory, event-based recommendations, timing with respect to events such as eating and sleeping, and the like. The electronic module can be provided as part of smart pill case 50, a separate add-on component, as a layer of or as an extension of smart pill case 50, or the like.

Optical sensors 31 can be configured to project electromagnetic waves, for example, infrared rays, to light-transmitting holes 21 of the medicine compartments, and sense different values depending on whether light-transmitting holes 21 are closed by the substances accommodated in the medicine compartments. The communication device transmits the sensed values to the mobile terminal, such as a smart device or smartphone, thereby allowing the user to monitor, by utilizing the smart device, whether a correct dose of medicine is accommodated in a medicine compartment or whether the medicine held in the medicine compartment is taken at a predetermined time. The communication device may include a communication device utilizing a short-range communication network, for example, BLUETOOTH, so that the smartphone of the user may be used.

Figure 1E:
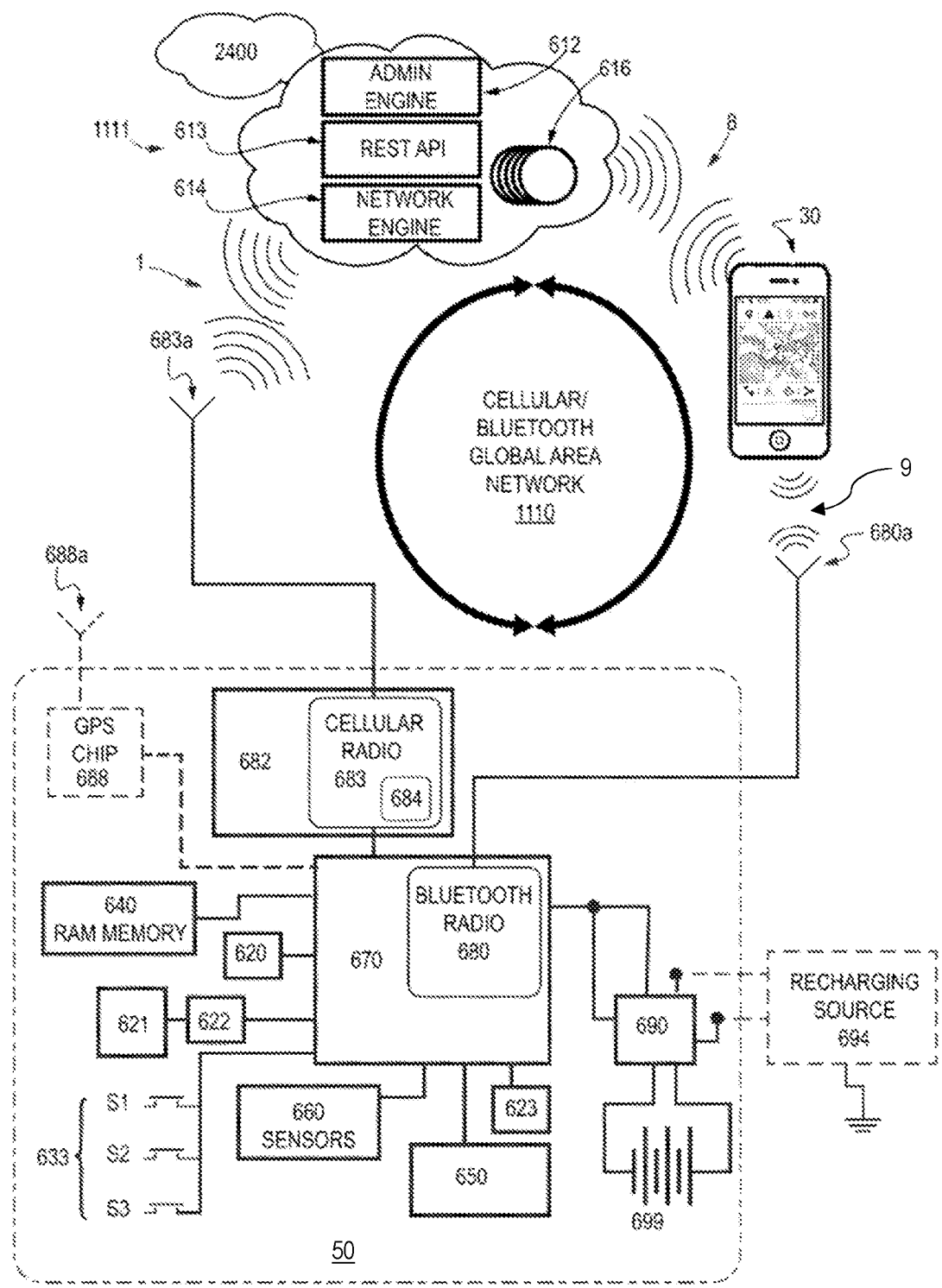
FIG. 1E is a schematic view of a cellular/BLUETOOTH global area network including a schematic of the smart pill case shown in FIGS. 1A-1D.

Top cover 4 can be rotatably coupled to main case 1 to selectively open and close the medicine compartments of medicine case 2 by a rotational motion. The smart pill case can be used to prevent a user from taking the same medicine over again as the smart medicine case unit has an easy-to-carry medicine case structure including a plurality of medicine compartments partitioned to separately accommodate different substances to be taken, such as medicine or dietary supplements, as shown in FIG. 1C. Smart pill case 50 provides the advantage of allowing the user to monitor, by utilizing a smartphone, whether a correct dose of a substance to be taken is within the pill case, whether it is time to take the substance, and whether there is a need to refill either the smart pill case or a prescription for medication to be held within smart pill case 50. Smart pill case 50 is configured to sense, through the optical sensors 31, whether a substance to be taken is properly held in each medicine compartment and whether a correct dose of the substance is taken at a time when it should be taken. Smart pill case 50 is also configured to transmit sensed values to the smart device, for example, through a BLUETOOTH communication network, as shown in FIGS. 1D and 1E.

As shown in the enlarged portion of FIG. 1B, smart pill case 50 unit includes a Hall sensor 32, a magnet 41, and a magnetic body 5, to sense whether the medicine case 2 is opened or closed, according to the rotational motion of top cover 4. As shown, Hall sensor 32 can be mounted on circuit board 3 at a position corresponding to magnet 41, to perform sensing using a Hall effect whereby a voltage is produced in a direction perpendicular to a current and a magnetic field, when a magnetic field is applied to a conductor through which current flows. Magnet 41 is arranged in top cover 4 at a position corresponding to Hall sensor 32, to form a magnetic field to produce the Hall effect.

Magnet 41 and Hall sensor 32 are respectively arranged in top cover 4 and on circuit board 3 and thus are structurally separate from each other even when top cover 4 is at a position to close medicine case 2. Due to the structural issues, sensing, using the Hall effect, may be difficult to facilitate. To overcome this problem, smart pill case 50 can include magnetic body 5 arranged between Hall sensor 32 and magnet 41. In other words, magnetic body 5 can be arranged between Hall sensor 32 and magnet 41 to allow a magnetic force of magnet 41 to reach Hall sensor 32.

Smart pill case 50 can be configured to provide information pertaining to the number of times medicine case 2 is opened. The information can be obtained by sensing, using the smart device, whether top cover 4 is opened or closed. Smart pill case 50 can also provide the advantage of preventing an erroneous record. In this regard, on-time taking, even when a substance to be taken, such as medicine or a dietary supplement, is taken or refilled, data is stored that is related to the substance held in a medicine compartment. The stored data is a then transmitted to the smart device only when medicine case 2 is opened and then closed by the rotational motion of top cover 4. Storing data can be prevented if medicine case 2 is simply opened but not closed.

Smart pill case 50 also includes a subcase 6 accommodated in an accommodation space 10 of main case 1, separate and apart from medicine case 2. Subcase 6 can be arranged between circuit board 3 and medicine case 2, and can have a single unpartitioned space unlike main case 1. Subcase 6 can include a plurality of light-transmitting holes 61 formed at positions corresponding to light-transmitting holes 21 of medicine case 2.

Figure 2:
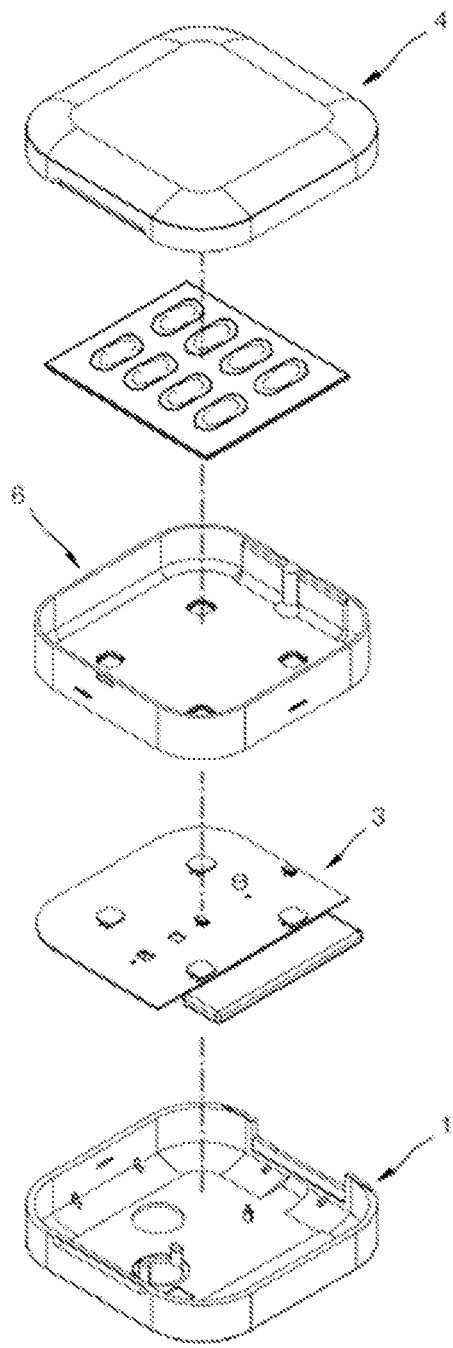
FIG. 2 is an exploded, perspective view of another embodiment of the smart pill case according to the present invention.

Subcase 6 may be used together with medicine case 2, as shown in FIG. 1B. If, however, medicine case 2 is separated from the remainder of smart pill case 50, as shown, for example, in the embodiment of FIG. 2, it is possible to accommodate a relatively large amount of medicine in smart pill case 50. In other words, medicine case 2 has a plurality of partitioned medicine compartments as shown in FIG. 2, and thus, the size of medicine or dietary supplement to be accommodated in each medicine compartment can be limited. Subcase 6, however, has a single unpartitioned space and thus may accommodate medicine that is sold at pharmacies generally in the form of a pack of pills or blister packs, rather than as individual pills, thus enabling the accommodation of a relatively large amount of medicine.

Smart pill case 50, including subcase 5, can further include a sensing device configured to sense whether medicine case 2 is separated such that only subcase 6 is used, for example, by separating medicine case 2 from subcase 6. In other words, the sensing device can include a Hall sensor 33 mounted on circuit board 3, and a magnet (not shown) provided in medicine case 2 at a position corresponding to Hall sensor 33. Given that the separation of medicine case 2 influences the Hall effect produced by hall sensor 33 and the magnet, the sensing device can smoothly sense whether medicine case 2 has been separated from smart pill case 50.

A smart monitoring method is also provided by the present invention, for taking medicine. The method involves monitoring whether medicine is taken by a user using smart pill case 50. The method provides the advantage of promoting the user's health, as the smart monitoring method is configured, as shown in FIGS. 1C and 1D, to sense, through optical sensor 31, whether a pill is placed on a light-transmitting hole 21 of the medicine compartment of medicine case 2. The method can involve transmitting a result of the sensing to the mobile terminal of the user through the communication device. The result can be transmitted to a display, to a display device of the mobile terminal, or the like. An image or message can be displayed corresponding to the result of the sensing and can indicate, for example, whether a substance to be taken such as medicine or dietary supplement is carried with him or her and whether a correct dose of the substance is taken at an appropriate and/or predetermined time. The method can be configured to inform the user of the result of the sensing through vibration, sound, a flashing light, and LED indicator, or the like.

FIG. 1E depicts a system including smart pill case 50 shown in FIGS. 1A-1D, with smart device 30 shown in FIG. 1D and cloud or network hosts 1111, 2400. A reference hub and a radiotag can also be parts of the system, though not shown in FIG. 1E. Smart pill case 50, illustrated in FIG. 1E schematically, can be part of a reminder system, for example, for generating medication reminders and for collecting sensor data from networks.

Smart pill case 50 and smart device 30 both have a BLUETOOTH (BT) radio and a cellular modem. A radiotag in smart pill case 50, and a reference hub (if utilized), can have a BT radio. In addition to a BT radio, smart device 30 can have a WiFi connection or serial USB connection that permits data sharing with network host 1111 or 2400.

The radiotag in smart pill case 50 transmits BT radio signals that can be received by smart device 30, or, if included in the system, by a reference hub. The radiotag can be configured to join a piconet with BT smart device 30 or with other BT devices, but can also be configured so as not to form a radio link directly to cloud server 1111 or cloud portal 2400.

Smart pill case 50 includes both cellular and BT radios, and a microcontroller or processor. Smart pill case 50, due to the presence of its cellular modem, can connect via cellular radio to cloud host 1111 (shown here with a virtual private gateway 2400). The connection is labelled 1 in FIG. 1E. This is defined as a "CALL HOME" 1, but in the interests of saving power, the cellular modem is used sparingly in tracking, locating, and uplinking data.

Data exchanges with the cloud from smart pill case 50 generally occur over a cellular connection but can also be routed through a reference hub via a BT connection or through a WLAN radio link. Similarly, data exchanges with the cloud from smart pill case 50 can be routed through smart device 30. In other instances, data received through a wireless connection or link 9 from a BT piconet or other IoT sensor device can be pooled in a memory of the smart pill case 50 or in a reference hub. Data can be shared over BT radio links, for example, over link 9, and then uplinked to cloud host 1111 via (i) a wired connection from a reference hub, (ii) via a BT connection to smart device 30 and then to cloud host 1111, or, (iii) via a direct cellular radio connection between smart pill case 50 and, for example, cloud server 2400. As used here, cloud server 2400 is representative of a class of cloud hosts termed "virtual private gateways."

Smart device 30 can be configured to uplink the BT radio layer to the cloud layer, and so too can a reference hub if included within the network. With the exception of a BTLE 5.0+ standard, BT data is generally transmitted by frequency-shift keying and hence cannot be directly injected into the IP packet data environment by which most cloud and smart device traffic is routed.

A CALL HOME from smart pill case 50 need not be a voice call. The CALL HOME can serve to refresh a network connection, to get a location fix from the network, or to update the system with current location and status of the smart pill case 50. If needed, a CALL HOME can generate a notification to a user or subscriber 11, or to a system administrator. Notifications can be programmable by rules-based logic resident in smart pill case 50, or in a system host, and are conditional on some aspect of the current status or location of smart pill case 50. Thus, emergent properties of hybrid lost-and-found networks can be used that combine BT and cellular devices in a 5G or LTE packeted network environment. Logic controls can be defined that limit when the cellular modem is used and how power savings states for cellular radio use are implemented to reduce battery drain while enabling "on demand" cellular network connectivity. Advantageously, whereas BT connectivity is hit or miss in many areas, cellular connectivity, once authenticated to a network, is much more reliable and structured over large areas of the planet, a key consideration in designing a global lost-and-found or tracking system for smart pill case 50.

The exemplary connections shown in FIG. 1E can include links 9 being a BT signal, link 1 being a cellular connection, and link 8 can be a cloud link routed through the packet data environment of a 5G or LTE cellular network, through Ethernet connections, through WiFi, or through other wireless or digital networks. Link 8 can be a link between smart device 30 through a packet data network to cloud host 1111, and can be wired, wireless, or a combination of both. Smart pill case 50 can connect via a cellular link to smart device 30, and can connect through link 1 to cloud host 2400, for example, via cellular or WiFi wireless links. Cellular links generally involve one or more cellular towers, base stations and other elements of a cellular telephonic infrastructure (not shown). WiFi links generally involve local and base station routers using IEEE 802.11a/b/g/n/ac/ah/ax and/or 802.15.4a/g WPAN radio technologies, for example.

BT links to smart pill case 50 can be optimized using dynamic gain. In making a response to a qualified incoming BT signal, smart pill case 50 will assess the RSSI, (or other index of apparent "path loss" such as RCPI or PER) of the incoming BT signal and can boost transmit power (broadcast power) if the incoming signal is weak or intermittent. Conversely, smart pill case 50 can reduce transmit power to save battery if the incoming BT signal from a linked transmitter is strong. A BT transducer operating in dynamic mode at a nominal 0 dBm can increase its transmit power, for example, to +4 dBm or +8 dBm, if a received signal from a linked transmitter is weak, and can decrease its transmit power, for example, to −4 dBm, or even −12 dBm, if a received signal is strong. In field use, a BT receiver can experience intermittent signal loss as the RSSI drops to a threshold of about −100 dBm or lower, but in order to restore a BT link or overcome edge effects, the BT transceiver can increase transmit power temporarily, and send a message that includes TX POWER as a field in the packet payload. The receiving device can calculate path loss from the transmit power minus the received signal power, and can increase its transmission power to compensate if needed. The Apple iBeacon, Eddystone, and other beacon formats include a native field with 8 bits for sending TX POWER, where TX POWER is defined as the nominal received power at 0 meters, in dBm, and the value ranges from −100 dBm to +20 dBm at a resolution of 1 dBm. The value is a signed 8-bit integer as specified by the TX POWER LEVEL characteristic in the BT SEC Specifications. As an example, an output as measured at 1-meter distance can be said to correspond to the transmitted power minus 41 dBm. A software development kit (SDK) can be used to implement dynamic gain in BT beacons so as to reduce energy consumption, for example. The kit can include a library or table of path loss-versus-distance calculations based on known factors such as type of smart device and environment (such as indoor versus outdoor) by which dynamic assignment of gain can be implemented to improve connection quality while minimizing unnecessary power consumption.

Cloud services are provided by cloud host 1111, optionally in cooperation with virtual private gateway 2400. Cloud services can be accessed via cellular radio from smart pill case 50, via smart device 30, represented in FIG. 1E as a smartphone, or via wired services. The cloud host can serve as a repository for sensor data and user profiles, for example, and can have much greater resources for analytics than the portable devices.

If a reference hub is included in the network, the reference hub can be in cloud communication via WiFi, for example, and smart device 30 can have a conventional connectivity by cellular and WiFi to the IP packet data environment of the World Wide Web, referred to herein as a global area network (GAN). Smartphone connectivity through GSM, LTE-M and 5G networks is ubiquitous and enables a capacity to deploy personal and community internodes having both cellular and BT network links.

Signals received on the BT radio of smart pill case 50 can cause the cellular modem to be activated when context dictates the need for a CALL HOME, for example, to establish a location fix, to communicate status to a cloud host 1111, 2400, or to generate a notification to smart device 30.

The cellular radio is packaged as a modem that stores the cellular network connectivity and synchronization data including IMEI and ISMI data. By combining the two radios in one device, the main disadvantage of cellular power saving mode (that the radio is unresponsive in sleep mode) is overcome because BT radios have a "flickering" standby mode that is "always listening" for radio traffic at low power even when the rest of the smart pill case 50 is in deep sleep. The latency of the system is adjustable, but can be satisfactorily balanced by making millisecond switches from passive listening to standby and back in a continuous repeating loop, and increasing active power to one or more device components if and only if relevant radio traffic is intercepted. More details about suitable system requirements and configurations can be found in U.S. Pat. No. 11,450,196 B2 to Daoura et al., which is incorporated herein by reference in its entirety.

The hybrid radio networks enabled by community deployment of smart pill case 50 and smart device 30 result in other emergent properties of the network. For example, the virtual geofence formed around a reference hub can be stationary and can be a radio tether: a repeating broadcast that defines a stationary radio geofence. The signal quality of the repeating broadcast, as received by a radiotag in smart pill case 50, in need of location monitoring, is an indication of the integrity of the radio tether: i.e., poor signal quality can indicate a deterioration or breakage of the radio tether as for example if smart pill case 50 leaves a safe zone area within the radio geofence. This enables an owner to implement location services such as monitoring the location of a smart pill case, monitoring a distance away from or proximity to a smart pill case, or the like. This also provides a community resource for creating a BT radio map of a neighborhood (the BT radiobeacon "lighthouse" effect).

As a basic tracking system for finding a lost smart pill case that includes a radiotag, aspects of the system that can be provided include: (i) BT radio proximity sensing functions and BT proximity locator services toolkit; (ii) radio contact data collection, data entry, and mapping functions, (iii) network servers with relational database functions and some level of machine intelligence, (iv) open access to global IP packet data networks, and (v) a cellular remote locator services toolkit. The systems can also include one or more private IP networks for providing virtual private gateway (VPN) functions. Synergy is manifested in the merging of the very particulate local network(s) of BT radios capable of ad hoc piconets, micronets, and local nets combined with the cellular network(s) that can span 2 miles or 20000 miles, for example, over transoceanic cables and orbital satellite relays.

In more detail, when BT signals from a reference hub are used to define a radio safe zone, the loss or decay of the BT radio envelope (such as measured by RSSI) around a mobile radiotagged smart pill case 50, is an indication of increasing distance, and if the BT radio signal is lost, smart pill case 50 can be configured to initiate a CALL HOME. Data reported to the cloud 1111 or to a virtual private gateway 2400 can be used to assess the location of smart pill case 50 and to issue notifications to an owner of the tagged asset or to make other interventions if the location relative to the geofence is not in compliance with a rule programmed by the owner/subscriber. BT radio alone is not sufficient for establishing a location fix where local area BT radio traffic is absent. GPS radio is not conveniently installed in BT radiotags because the process of calculating GPS location is very energy intensive. Thus, the capacity to make a network assisted cellular location fix is advantageous for the smart pill case of the present embodiment.

A reference hub can be included in the network and can function as a mobile or stationary radio geofence. The hub can include means for monitoring radio signals from smart pill case 50, or vice versa, and can also monitor signals from, for example, smart device 30. The hub, smart pill case 50, and smart device 30 can be configured to convey notifications, commands, and data to and from compatible radio devices, for example, including the hub, smart pill case 50, and smart device 30. In various embodiments, the system can be configured so that any detection of a signal from smart pill case 50 outside a designated "geofenced" area will result in an alarm or a notification to a responsible party. If smart pill case 50 loses the signal from the reference hub, smart pill case 50 can be triggered to CALL HOME and to obtain its location independently using its cellular radio. The relative proximity of smart pill case 50 and smart device 30 can be estimated from the strength of the BT radio signals between the devices. A rough position can be refined by triangulating BT signals between smart device 30, smart pill case 50, and, for example, a reference hub.

If smart pill case 50 leaves a safe zone, an advantageous capacity is the ability to turn on the cellular modem when needed to find or track the lost asset. Logic can be sued to minimize any power loss by eliminating unnecessary cellular radio traffic, but to acquire or reactivate a cellular network connection if the radiotag in smart pill case 50 is outside the safe zone. In an example, the owner of smart pill case 50, and the owner's smart device 30, might travel in a first direction, whereas smart pill case 50 might be travelling in a second, different direction, for example, if smart pill case 50 is left on a bus that is leaving a bus stop. In another example, the owner of smart pill case 50, and the owner's smart device 30, might travel in a first direction, for example, when leaving a house, whereas smart pill case 50 might not be travelling at all because it had been left at the house. In an ideal situation, the radiotag of smart pill case 50 will know that the smart pill case 50 is relatively astray in relation to the owner, before the owner knows, and smart pill case 50 will initiate a CALL HOME and cause an alert to be sent to the owner's smart device 30. The system can thus exhibit a situational awareness regarding its component parts and their relationships with respect to each other. The system can define an ecosystem and can analyze and maintain a situational awareness of all components of the ecosystem. Artificial intelligence can be implemented to enable the system to learn behaviors of the system user. Artificial intelligence can be implemented to enable the system to anticipate actions and activities of the system user. Artificial intelligence can be implemented to generate alerts based on expected positioning and spatial relationships of the user and system components. Artificial intelligence can be implemented to generate alerts based on a recognized pattern, based on an approach vector, based on a combination thereof, or the like. Artificial intelligence can be implemented to generate alerts based on events, consequences, repetitive actions, learned behavior, or a combination thereof.

In various embodiments, the reference hub can be a conversational hub, such as the smart home hubs sold as Google Assistant, Echo Plus, Bixby, Siri or Alexa. The computing resources of the cloud can be interfaced with a reference hub having a speaker and microphone and a voice-cloud interface for asking simple questions. These plug-in devices have BT radios and are useful to monitor radio proximity and to interact with radiotags such as the radiotag within smart pill case 50.

Smart pill case 50 can be used in conjunction with a BT radiotag to keep track of things. Of themselves, autonomous ad hoc BTLE networks are unique for several reasons, i) because BTLE devices are small and are readily embedded in wearables, in things, or even organisms, ii) because they are digital radios capable of energy-efficient radio communication at 0 dBm or less, and iii) because the radio devices in the network are true peer-to-peer (P2P) networking tools in which one device can act as master in one or more networks while simultaneously acting as slave in multiple other networks, and the roles are interchangeable. While initially developed for pairing accessories to cellphones (Ericsson Mobile, Stockholm), BT pico- and micronets have been discovered to have surprisingly useful emergent properties because they dispense with base stations and access points and spontaneously form autonomous FH-CDMA peer-to-peer (P2P) mesh networks. There is no single point at which transmission in a network can be disrupted. By hybridizing BT networks with XCB networks, yet another level of emergent properties can be achieved.

The BT radios are entirely self-sufficient digital radios and can pick up BTLE transmissions from up to 1500 ft away. The cellular radios are native to cellular networks, and can quickly be located anywhere around the globe. Having both radios together in a smart pill case provides a dramatic increase in search granularity, the cellular radio providing a general location and the BT radio permitting the owner of a lost article to activate a BLUETOOTH Proximity Locator Services Toolkit so as to locate the lost article by sight, sound, or feel, as will be described below, or even to display a detailed map with the location of the lost radiotag on a companion smartphone.

To enable user programmability, the system can include an application installable on smart device 30. Lost-and-found services are achieved with one or more of radio devices, for example, a radio tag in smart pill case 50, when used in combination with software installed by a user on smart device 30. Related tracking functions are enhanced by the participation of a cloud host 1111, but in many cases, only a radiotag within smart pill case 50 and an active hub are needed to monitor asset location within a radio perimeter. In some instances, smart device 30 can act as a hub. The software supplied to the user, when installed on smart device 30, can function, for example, to relay sensor data and radio contact reports to the cloud host. The software can also function to receive notifications sent to smart device 30 and provide a user interface for setup and customization of features of the network. Webpages are accessible using smart device 30, which can include administrative tools for navigating through, managing, and customizing programmable features of a BLUETOOTH or dual radio smart pill case, and for selecting notification instructions and preferences, entering user information, updating or upgrading subscriptions to cloud services, and the like. The smart device need not be in a user's possession to be accessible by radio and many functions of a smartphone can be accessed in background while it remains in the user's pocket.

The application generally supports a graphical user interface (GUI) configured to monitor, track, or help locate, a radiotagged smart pill case. Smart pill case 50 can also be configured to function independently to keep track of smart device 30. Synergy is immediately apparent in that smart pill case 50 can include sensor functions, for example, for detecting and alerting if a smart pill case user has had a fall. Smart pill case 10 can also establish a mobile safe zone when placed in a vehicle where access to WiFi is not available.

The cloud is capable, with permission, of controlling smart pill case 50, for example, by causing smart pill case 50 to go into an alarm state as a convenience, when it is missing or misplaced. But the opposite can also be true such that smart pill case 50 can be configured to control functions of smart device 30. Functions such as taking a picture, responding to an email, sending a hug to a loved one, and indirect or direct control of remote machines, such as opening a garage door on the way home, starting the coffee pot from bed, turning off the alarm clock without getting up, and checking that all the doors in the house are closed and locked, can be programmed into the system with the smart pill case 50 functioning as both a sensor and an actuator. In some instances, an XCB radiotag can be embedded in the effector or remote machine.

As shown in FIGS. 1A-1E, smart pill case 50 can include a hard case such as of a clamshell construction. A battery access port can be provided on an undersurface of the case, or, in various embodiments, smart pill case 50 can be sealed and can be inductively rechargeable. A USB port for recharging and data transfer can be provided, for example, at the back lower end of the device or along a side of the device. A battery or mobile power supply, and supporting circuitry, can be included in or in connection with smart pill case 50. The case can include an annulet or slot for receiving a lanyard or chain. An actuator or switch can be formed on an upper surface of the case and can function as a "homing button" to cause the device to CALL HOME when the switch is depressed.

The smart pill case can include cellular and BT radio modems with multiband antenna in a sealed package. Inductive charging can be provided and achieved with a Qi or NFC antenna on the base of the device. In addition to a center activation switch on the top of the case, an RGB-LED can be inlaid on the wall of the case and can extend in a band along about a 180-degree arc opposite the tabbed annulet. The RGB-LED can be segmented and can operate in a pulsatile or function-specific mode to provide feedback during user setup and interactions. A speaker with resonant voicebox and microphone can also be included. Battery life can range from weeks to months depending on the frequency of cellular network uplinks and the latency in the BT scanning mode. The smart pill case can include a user interface that in-turn can include, for example, button switches, LEDs, and a buzzer or speaker. The smart pill case can be operable on battery power and can include a battery access port. Optionally, the smart pill case can include a USB recharging port or an inductive recharging circuit.

The smart pill case can include a sealed shell with potted internal components for weatherproofing. The device can include a multifunction capacitive or diaphragm-type button switch. In various embodiments, the button switch can function to trigger a CALL HOME when pressed. For example, a passerby, who finds a lost smart pill case, can press the button to activate a notification that goes out to the owner, and the notification can include a location. In some instances, a system that monitors radio signals from the device can offer other asset management services. Similar applications are readily apparent in managing lost children and assets generally.

The smart pill case can include edge-mounted touch capacitive switches and a translucent body for viewing the activity of an RGB LED assembly within the sealed case. An NFC antenna or "Qi" charging antenna is provided along with a 2400 mAh LiPo battery, for example. The case functions as a resonant diaphragm with internal speakers and microphones in a noise-cancelling array. Dual-band antennas are configured for BT and WiFi at 2.4 and 5 GHz and a multi-band LTE antenna are connected to BT, WLAN and cellular radio modems under common control of a BT modem and microprocessor. A battery, SIM card and micro-SSD card slot can be included and accessible, for example, in a threaded door on the underside of the device. The device connects to a user's smart device for access to a more detailed user interface. The device can also be configured to respond to voice inquiries and make voice notifications.

The BT radio in the smart pill case can monitor local radio traffic and report to a system host periodically. The device can learn familiar radio environments and issues notifications if the radio environment manifests characteristics of an unfamiliar or alien location or unexpected presence of strangers. Voice SMS messaging can be enabled by pressing a switch once to receive a voice message and twice to record and send a message. Each voice SMS message can be recorded as a digital file, transmitted, and the message can be unpacked for replay at a receiving device. The location of the device can be monitored remotely using periodic actuation of cellular network-assisted AGPS and will report location and heading on a map to a parent smart device, for example, by subscription.

As mentioned above, FIG. 6C is a network schematic showing smart pill case 50 and cloud host(s) in a combined BT and cellular network 1110. Global area network (GAN, 1110) is built from a cellular network, a BLUETOOTH network, and a network of cloud hosts 1111. A single smart pill case 50 and a single smart device 30 are shown for simplicity but each layer of the network can include more than one radio unit and computing machine.

Cloud host 1111, broadly, is a virtual network and can also include one or more virtual private gateways (VPG, 2400) with private IP addresses. In a preferred embodiment, CALL HOME traffic is addressed to a dedicated IP address of a VPG. Use of private IP addresses with a VPG 2400 reduces any security concerns with remote location tracking of smart pill case 50, for example, but the rate of battery power loss due to inadvertent, unauthorized, and network-incidental messaging is also reduced.

In various embodiments, cloud administrative host 1111 uses an IP address to access smart pill case 50 by the BT radio modem 680 or by the cellular radio modem 682, depending on which radio(s) are active. For security, smart pill case 50 can be operated as a cellular device accessible by an IP address on VPG 2400 to find and track the whereabouts of the device via a dedicated and secure 5G private network or gateway VPG.

Data uplink and downlink occurs in a packet data network, and can conform to TCP/IP or UDP protocols. Data transfer by SMS messaging is also enabled. Data can include embedded AT commands to the cellular modem 682 with cellular radio 683, for example, or a qualified BT or cellular signal can cause the processor 670 to generate an AT command to the cellular modem. Packets include a header and payload as known in the art.

Location data is of particular interest in a medication reminder application. Smart pill case 50 can include one or more logic triggers that causes a cellular network connection request, direct or indirect, and the upload of data, referred to herein as a CALL HOME. The trigger can be sensor data such as accelerometry or button data, a timer, or can be a trigger inherent in the topology of the physical web, for example. A direct upload of location data to the cloud host 1111 or VPG 2400 can be requested by the network or by smart pill case 50, either when the cellular modem 682 executes or responds to a paging window call or when the BT radio 680 receives a cellular connection request via BT radio signal. At any time when there is a BT connection with a piconet, in which there is a cellular-competent smart pill case 50 in the piconet, indirect uplink of data to the network can be executed over BT radio links. Generally, smart device 30 will forward the data to the cloud host via network connection 8.

In various embodiments, the SIM module 684 can serve to establish an exclusive private IP address for smart pill case 50. VPG network 2400 can collect location information periodically from cellular modem 682 to create a "trail of waypoints" that track locations of smart pill case 50.

The cloud host also adds a layer of artificial intelligence. By supplying and aggregating data from sensor networks composed of smart pill case 50 and smart device 30, with or without other devices such as a reference hub, dynamic control of cellular radio activity in smart pill case 50 is enabled. As internodes between cellular and BT mesh networks, smart pill case 50 can serve an important role in bridging connectivity over much larger areas, while also preserving the proximity and open intimacy that characterizes BT radio. The cloud host can be useful in storing data and preferences, in looking up device identifiers, in making notifications across the Internet, in making long distance connections, and in aggregating large amounts of sensor data.

The cloud host server 1111 can include a REST API 613, for example. Once authenticated, the cellular modem 682 with radio 683 can uplink data to the cloud host 1111 and receive commands and data. Using an API 613, the cloud host parses sensor data, radio contact records, extracts relevant information, and combines that information to generate executable commands that can take the form of a medication reminder, a notification, a warning, or an intervention. User programmable commands that are conditional on sensor data, location, time or other inputs can be stored in user profiles in database(s) 616 and accessed at administrative engine 612. Any notification or executable command is handled by the network engine 614 and can involve one or more smart devices 30 or other remote machines as intermediaries, or can be delivered directly to smart pill case 50 during a paging opportunity when the cellular modem 682 is receiving, or directly to smart pill case 50 in a BT signal via BT radio 680.

Cellular modem 682 includes cellular radio 683, which is connected to antenna 683a. Modem 682 can be, for example, a Monarch LTE GM01Q (LTE-M/NB-IOT such as the SQN66430 SiP) or NB01Q (NB-IOT) LGA module with integrated SIM platform (Sequans, Paris FR) for machine data exchange. Monarch SOCs such as the SQN3330 generally include an integrated cellular RF front end, but not BT radio. Sequans modules typically support a variety of LTE bands for worldwide connectivity and consume less than 1 uA of power with PSM and eDRX modes and providing for batch data transmission in a centimeter-sized combination.

Generally, the information needed to authenticate to the cellular network is stored in a SIM unit 684 that is part of cellular modem 682 and can also be used for higher quality encryption of data. Cellular networks are closed networks and connections are subject to higher authentication security administered by the network. All cellular radio devices are authenticated by IMEI and IMSI information contained in a SIM module, as known in the art. A dedicated control frequency is used for coordinating the connection of user equipment (UE) to the network.

A GPS chip 688 is shown with a separate antenna 688a. Antenna 680a is tuned for BT spread spectrum transmission and reception. Notifications can be received via either the BT radio 680 or the cellular radio 683 (with antenna 683a), and can result in a display such as activation of speaker 621 via acoustic driver 622. Optionally, a microphone 620 is included so that responses to notifications can be sent. Both the BT radio and the cellular radio are capable of transmitting and receiving voice signals.

Processor 670 can be programmed, or otherwise configured, using software resident in ROM (such as EEPROM 650) or as firmware, or a combination of both software and firmware. Processor or MCU 670 includes a BT radio die as an SOC 680 configured to transfer data and commands to and from the processor. The BT radio can control the power mode and sleep cycle of the processor and the cellular modem. Exemplary BT chipsets for BT radio include the Nordic nRF52840 (Nordic Semiconductor, Portland Oreg.) with ARM® Cortex M-4 processor, the Dialog DA1468X family, Dialog Semiconductor, Reading UK) or the Texas Instruments CC1640r2F (Texas Instruments, Dallas Tex.) with low power sensor controller for IOT applications. Other BT chipset manufacturers include STMicroelectronics, On Semiconductor, U-Blox, Silicon Labs, Toshiba, Ankya, RDA, and Cypress (Infineon). CSR (Qualcomm), Broadcom (Belkin) and MediaTek can supply BT chips used in smartphones.

In various embodiments, multiband antennas can be used. Fractal and diversity antennas are becoming familiar technology and are both inexpensive and compact. Ceramic antennas can be used. The antenna design can include the circuit board as a whole, the case, the battery, and any NFC or Qi antenna as well, and thus mobile edge radio can benefit from software-defined radio supplemented with software-defined antenna. In various embodiments, FET gate arrays are used for impedance matching over multiple bands. These packages are included in a small radiotag that fits in the smart pill case, for example, is embedded in the asset.

RAM 640 is provided for storage of volatile data, such as for data logging of sensor data. Sensor package 660 can include a single sensor or various combinations of sensors as a package. In some instances, one or more of the sensors are incorporated into the processor. The sensors can include an accelerometer 623.

The size of the RAM memory 640 is dependent on the size of the memory requirement for data. Stored data can include data from sensors 660 and from switches 633. Data from throw- and button-press switches is considered data. Stored data can also include radio contact records. The memory can be supplied as cache memory in the processor, or can include external RAM if data logging functions requires it.

Working memory can also include dedicated registers for handling packet composition and decomposition, for encryption keys, and so forth. BT and cellular radio signal buffers can be gated by the processor and can include registers for parsing commands and command parameters from datastreams. This memory is generally distinct from non-volatile read-only memory 650 for storing processor instructions. EEPROM memory registers can be supplied, or, in some instances, firmware or combinations of EEPROM and firmware can be used.

To save power, the cellular modem 682 and the processor 670 can default to a power savings mode and it can be a BT radio signal (received on antenna 680a and conveyed to the processor by BT radio 680) containing a qualified wake signal that tasks the processor to initiate some routine that wakes up various higher functionalities of the circuitry of smart pill case 50.

These higher functionalities can include initiating an uplink or a tracking area update (TAU) via the cellular modem 682. In one illustrative embodiment, the cloud host sends a signal to the BT radio 680 via the BT radio of an intermediary device such as smart device 30, and that signal will cause the cellular modem 682 to initiate a CALL HOME, for example, optionally bypassing smart device 30. In this way, the cellular modem can be kept in a dormant or semi-dormant state most of the time but retains the capacity to report to the network and to execute network commands with reduced latency in response to an override command. The cellular modem can minimize or at least manage the kinds of energy demands.

A Bluecell radiotag can be used as a radiotag for smart pill case 50. Bluecell tracking devices and methods can be used, including those described, for example, in U.S. Pat. No. 11,184,858 B2 to Daoura et al., which is incorporated herein in its entirety by reference. The radiotag can be enabled to receive a cellular power management mode override signal (or related power management parameters) in a BT radio signal sent over a piconet or via link 8 to a compatible smart device 30 and therethrough 9 in a connected or connectionless data transfer to the BT radio 680. Alternatively, during a CALL HOME, the cellular network can make modifications to the default cellular power savings mode.

Sleep management can include a restricted schedule of cellular activity, for example in a DRX or eDRX mode (extended discontinuous reception cycle) in which the network management node and the user equipment pre-arrange discrete time intervals in which pages will be delivered. The receiving device wakes up to monitor for a paging event (physical downlink control channel) at discrete intervals.

During an eDRX event, the cellular receiver is active and linked to the network so as to receive a page. Reception is an active process and can involve transmission of signal quality responses or command acknowledgements. Configurable parameters of eDRX include Paging Time Window (PTW), HSFN (system hyperframe numbering) and eDRX cycle length duration. The eDRX updates the clock synchronization. In a paging window, new commands can be received as a downlink, but generally an eDRX goes by without the need for an uplink of data in a paging opportunity. In modified eDRX, the initial paging window becomes a connection for data uplink so that a cellular location fix by the network POLTE service or an equivalent can be completed. The device then returns to sleep or idle mode unless other paging instructions are sent. eDRX parameters are established during at ATTACH and TAU data transfer in the initial connection request or in subsequent updates to TAU. By these adaptations, eDRX can become a routine process of acquiring and storing a series of locations or waypoints, each with a timestamp.

Wake up in eDRX can be modified in response to a PDCCH page with a RCC-compatible request for location assistance. The network location assistance request (LAR) involves sending a snippet of signals captured from a plurality of cellular base stations back to the network, generally about 30 Kbytes in length, and receiving in return, a position fix with latitude and longitude from the network. In this way, network location fixes can be obtained every two minutes, 5 minutes, or 10 minutes, and there can be a TAU once an hour or three times an hour as required to maintain network synchronization and to balance network loading, for example.

During a tracking area update (TAU), if, for example, smart pill case 50 has shifted out of a cellular tower coverage area, the cellular modem will lock on to a new tower with stronger signal to authenticate itself and renew its network connection at the new tower. Location data is updated during this "handover" process and will be stored in the memory of the host device or in a network database. The cloud host 1111 can be notified if smart pill case 50 is reallocated from one cell to another as it moves. Because this can occur when cell traffic is being levelled (i.e. by shifting users from a crowded cell base station onto an adjacent base station having lighter traffic) the cloud host can monitor the base station carrier channels in the network path to differentiate location changes that are traffic load driven versus changes initiated because the cellular radio 683 and antenna 683a detected a stronger signal from an adjacent base station and elected to initiate a handover to the new system transmitter because it had been moved.

Once the cellular radio is on and authenticated to the network, then network-assisted location fixes on its transmissions can be performed automatically. When requested by the network, smart pill case 50 can supply GPS coordinates or data to assist in AGPS, for example. The device can optionally include a Satnav radio 688 and antenna 688a with specialized processing module for calculating position from the timed signals of satellites in low earth orbit. Some cellular radio chips 683 are provided with the accessory GPS radio integrated into the die. If needed, a network location assistance request (LAR) can seed a Satnav positioning calculation by the onboard GPS chip so as to reduce time and energy for making the calculations. A device energy budget can be used to balance the relative need for Satnav positioning calculations versus network-assisted LAR position data and can be configured according to user specifications or modified on the fly by commands sent from the network. The network can use PoLTE or AGPS to assist in device location calculation, measurement, reporting, and identifying local landmarks, and distances andf directions to local landmarks.

BT radiobeacons or hubs having known fixed locations can also be used to refine location, particularly in indoor environments. Google supplies Eddystone and a Proximity Beacon REST API that allows users to register a beacon with location (Lat/Long) and indoor floor level, for example, which is wiredly used to geotag commercial establishments and places of interest as a physical web. Reference hubs can be configured to function as "lighthouse radiobeacons" in broadcasting stationary position coordinates.

Uploads of location data stored in memory 640 can be executed from time to time. A direct upload can also be requested by the network or by the device, either when the cellular modem 682 executes a paging window call or when the BT radio 680 receives a cellular connection request. During a BT connection with a piconet, in which there is a cellular-competent device in the piconet, indirect uplink of data can be executed over BT channels. A powerful set of tools for location-directed network services emerges by combining a Cellular Remote Locator Services Toolkit and a BLUETOOTH Proximity Locator Services Toolkit.

Smart pill case 50 can be rechargeable from an optional recharging source 694. Battery 699 can be disposable or rechargeable via circuit 690. Other energy harvesting means known in the art can be used to extend the operating lifetime of the device beyond that offered by one full battery charge. A switching regulator can be used to manage power to the processor and radios.

Figure 3A:
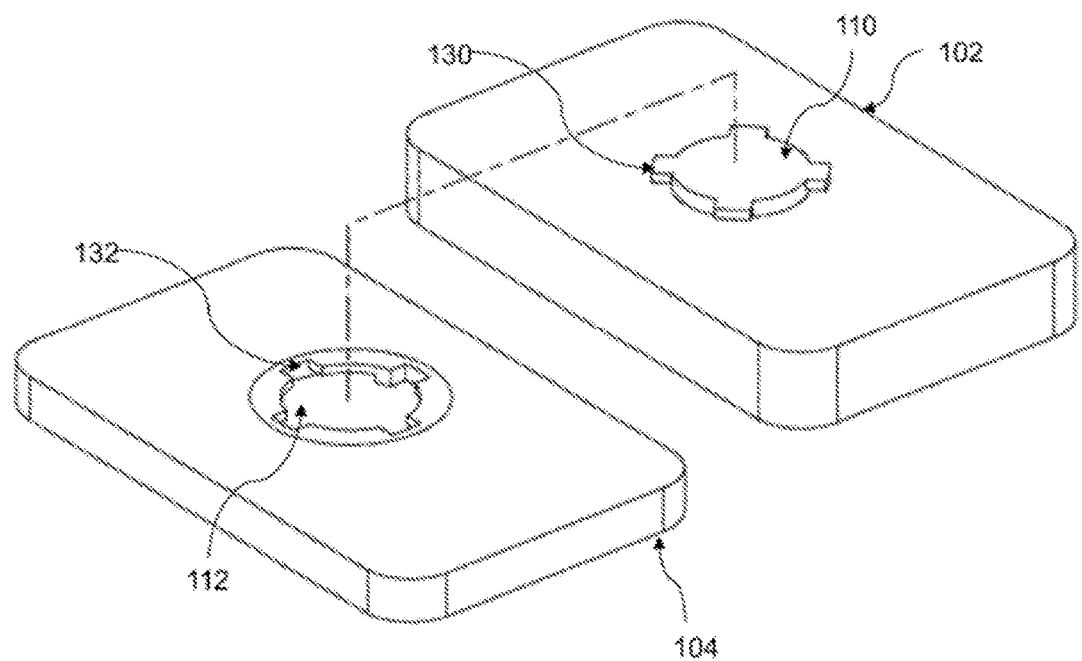
FIG. 3A is a perspective view of a combination of a smartphone phone case and a smart pill case, according to various embodiments of the present invention.
Figure 3B:
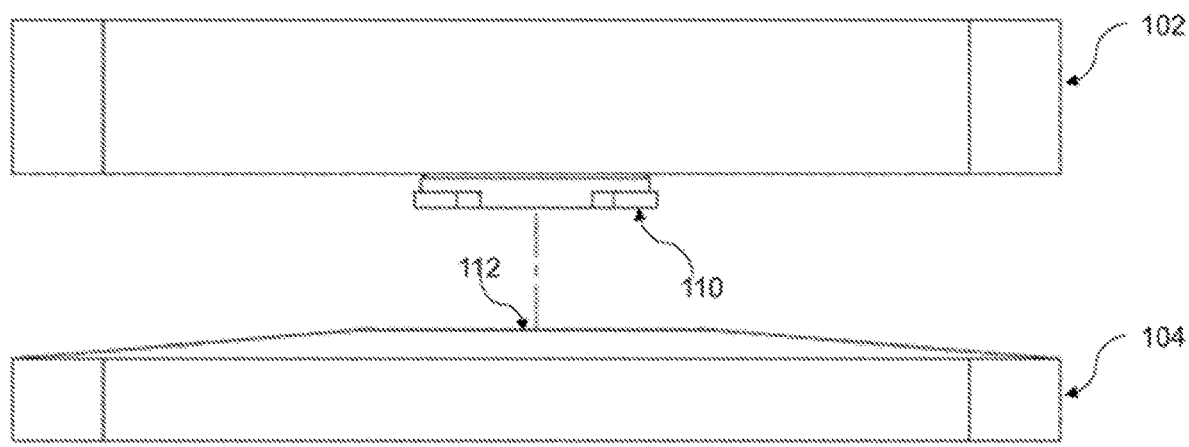
FIG. 3B is a side view of the combination shown in FIG. 3A.

FIG. 3A is a perspective view of a combination of a smartphone phone case 102 and a smart pill case 104, according to various embodiments of the present invention. Smartphone phone case 102 has a coupler 110 that includes interlock projections 130. Interlocking projections 130 compliment such that they can be received in interlock recesses 132 that form part of a receiver 112 of smart pill case 104. FIG. 3B is a side view of the combination shown in FIG. 3A, wherein smartphone phone case 102 and a smart pill case 104 are separated from one another.

Figure 4:
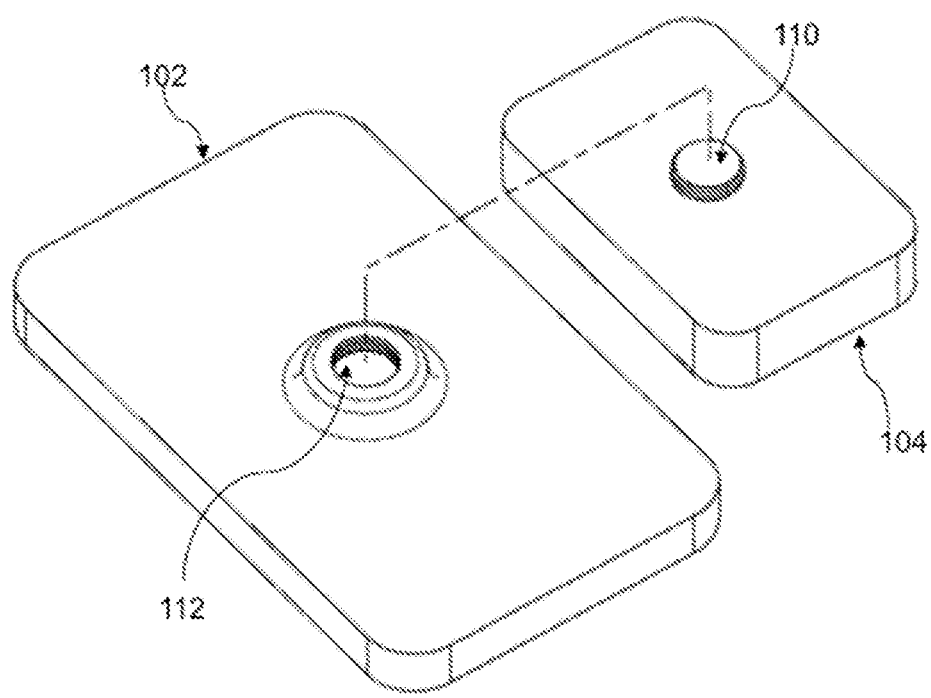
FIG. 4 is a perspective view of another combination of a smartphone phone case and a smart pill case, according to various embodiments of the present invention.

FIG. 4 is a perspective view of another combination of a smartphone phone case 102 and a smart pill case 104, according to various embodiments of the present invention. Although the reference numerals shown are the same as those used to describe FIGS. 3A and 3B, the smartphone phone case 102 and a smart pill case 104 shown in FIG. 4 are different from those shown in FIGS. 3A and 3B. In FIG. 4, smartphone phone case 102 has a coupler 110 in the form of a magnetic component, for example, a permanent magnet. Permanent magnet 110 has a shape that is complimentary to the shape of a magnetic recess receiver 112 of smart pill case 104.

Figure 5:
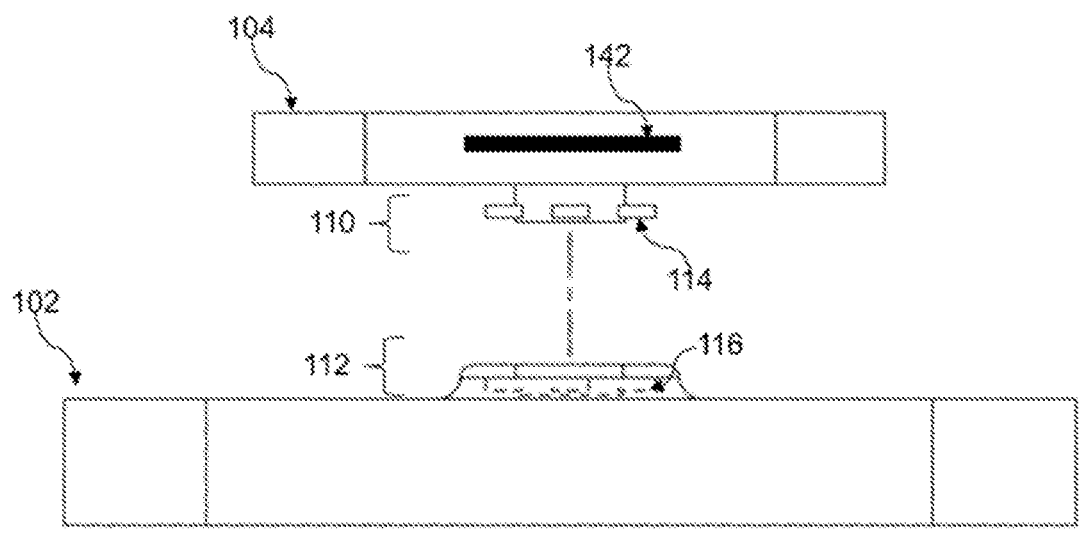
FIG. 5 is a side view of yet another combination of a smartphone phone case and a smart pill case, according to various embodiments of the present invention.

FIG. 5 is a side view of yet another combination of a different smartphone phone case 102 and a smart pill case 104, according to yet other various embodiments of the present invention. Smartphone phone case 102 includes a receiver 112 having interlock recesses 116 that accommodate projections 114 of a coupler 110 of smart pill case 104. Smart pill case 104 includes a data transfer port 142 that can be used for data transfer, charging, inventory management, and the like.

Figure 6:
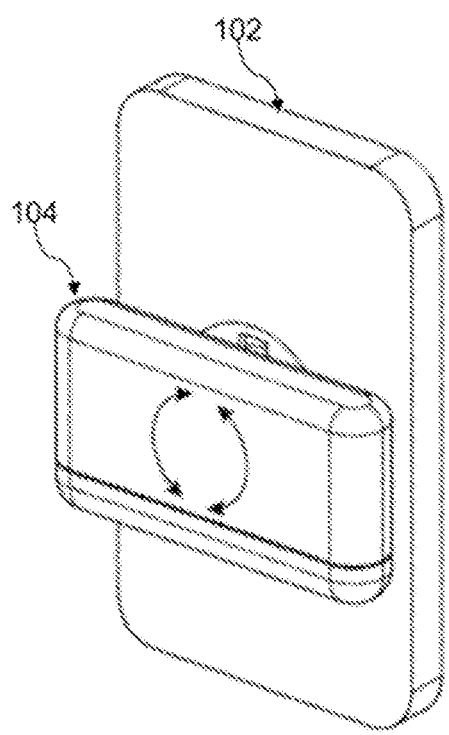
FIG. 6 is a perspective view of an assembled combination of a smartphone phone case and a smart pill case, according to various embodiments of the present invention.

FIG. 6 is a perspective view of an assembled combination of two components, namely, a different smartphone phone case 102 and a different smart pill case 104, according to yet other various embodiments of the present invention. Through an engagement of projections and complimentary recesses, a coupler of one of the two components can engage and disengage with a receiver of the other component, to lock the two components together and unlock them. In some embodiments, each component can have a coupling feature and a receiving feature.

Figure 7:
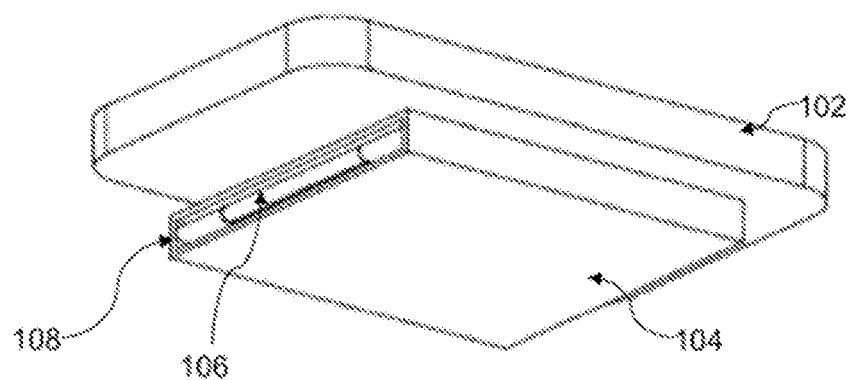
FIG. 7 is a perspective view of yet another assembled combination of a smartphone phone case and a smart pill case, according to various embodiments of the present invention.

FIG. 7 is a perspective view of a smartphone phone case 102 having an integrated smart pill case 104, according to various embodiments of the present invention. As with the other embodiments described herein, smart pill case 104 can comprise any of the smart pill cases described herein. In FIG. 7, integrated smart pill case 104 can be opened by pivoting at a hinge 106 about a pivot pin 108, so as to be swung away from smartphone phone case 102.

Figure 8A:
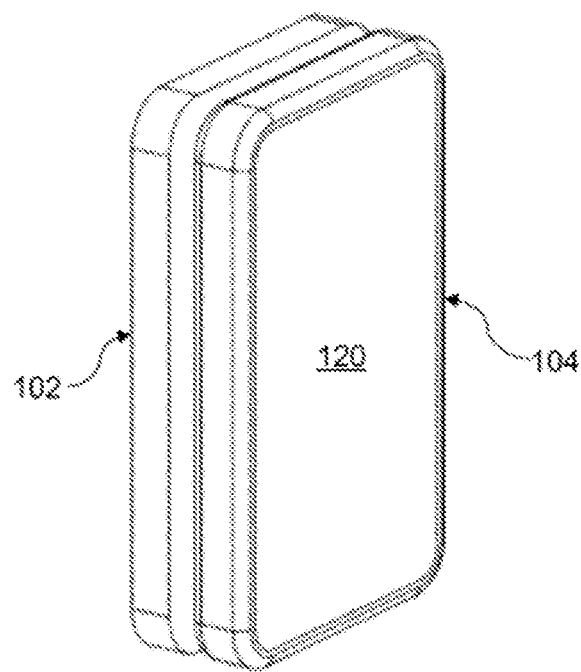
FIG. 8A is a perspective view of yet another assembled combination of a smartphone phone case and a smart pill case, according to various embodiments of the present invention.
Figure 8B:
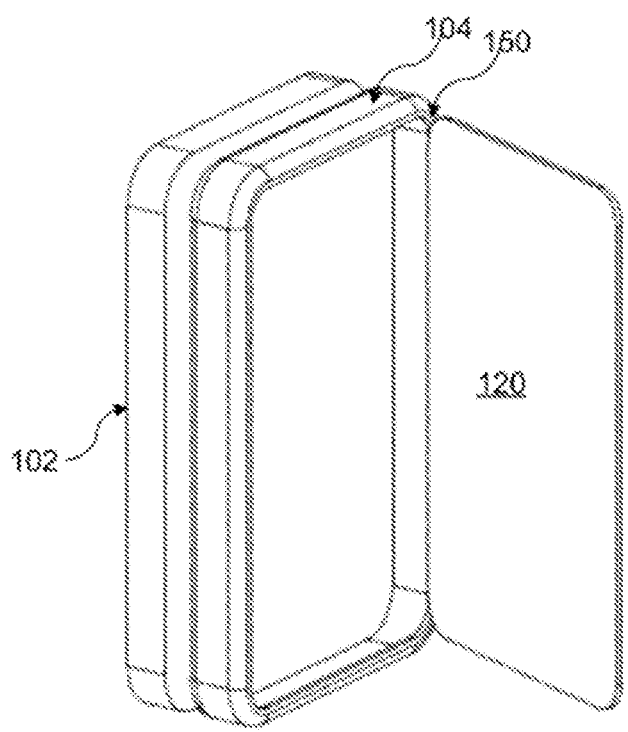
FIG. 8B is a perspective view of the assembled combination shown in FIG. 8A, but with the smart pill case compartment door open.

FIGS. 8A and 8B are perspective views of yet another combination of a smartphone phone case 102 and integrated smart pill case 104, according to various embodiments of the present invention. As with the other embodiments described herein, smart pill case 104 can comprise any of the smart pill cases described herein. As shown, smart pill case 104 includes a door 120 that can be opened by pivoting about a pivot pin 150, so as to be swung open, away from smartphone phone case 102.

Figure 9:
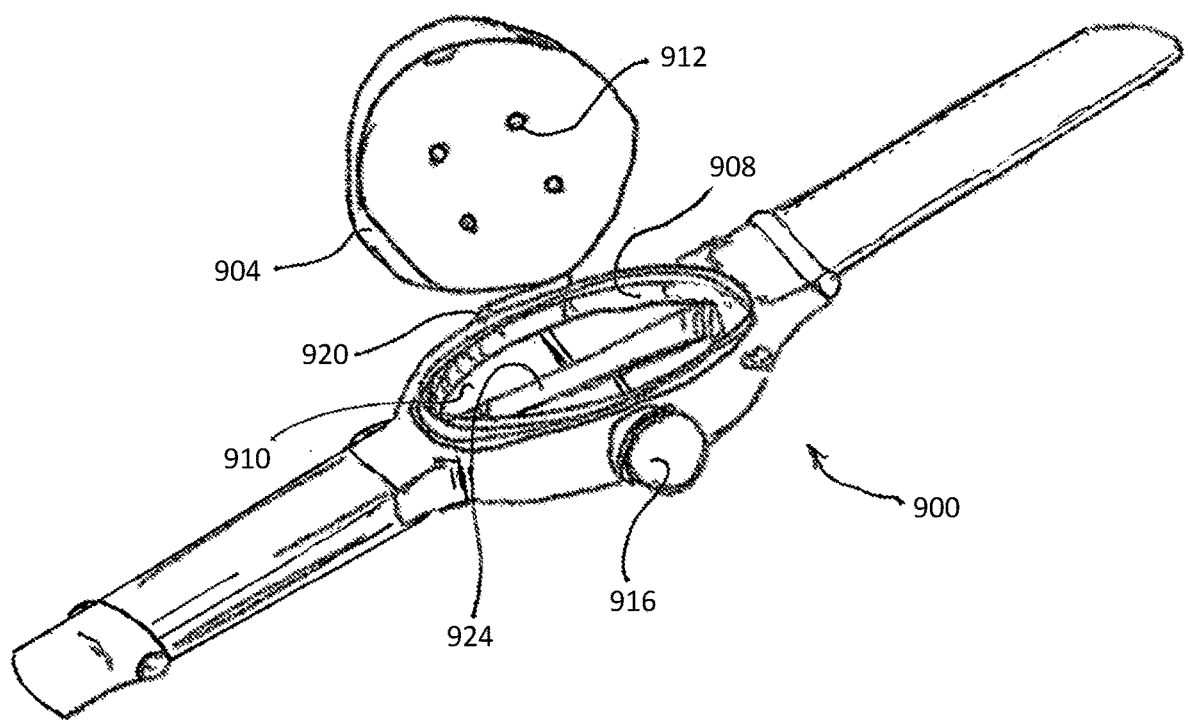
FIG. 9 is a perspective view of a smart pill case in the form of a smartwatch, according to various embodiments of the present invention.

FIG. 9 is a perspective view of a smart pill case in the form of a smartwatch 900, according to various embodiments of the present invention. Smartwatch 900 comprises a watch unit 904 and an integrated pill case 908 that are hinged together at a hinge 920. Pill case 908 includes four separate pill compartments 910 that are separated from one another by dividers. A latch 916 is provided along an outside surface of pill case 908 and can be activated to open pill case 908 by pivoting watch unit 904 away from pill case 908 at hinge 920. A plurality of sensors 912 are mounted on the underside of watch unit 904 and are directed at the contents of pill compartments 910. In the embodiment shown, one sensor is provided for each respective pill compartment and is configured to sense the contents of the respective pill compartment. Any number of pill compartments and sensors can be provided, with four of each shown in the exemplary embodiment illustrated. The sensors can be optical sensors, weight sensors, proximity sensors, light transmission sensors, acoustic sensors, a combination thereof, or the like. As an example, sensors 912 can be of the type described for use in the smart pill case shown in FIGS. 1A-1D herein.

Smartwatch 900 also has, built therein, an accelerometer 924. Accelerometer 924 can be configured to sense motion of smartwatch 900 and to generate an accelerometric signal indicative of the motion. Watch unit 904 can be configured with a processor, logic, and circuitry that receives the accelerometric signal, analyze the accelerometric signal, and determine whether the accelerometric signal is consistent with a signal that would be received if the wearer of the smartwatch 900 were eating food, that is, moving in an eating gesture. If the smartwatch processor determines that the smartwatch is moving in an eating gesture, a medication reminder can be generated by smartwatch 900 reminding the wearer that medication should be taken before, during, or after eating, or at a combination of such times.

Figure 10A:
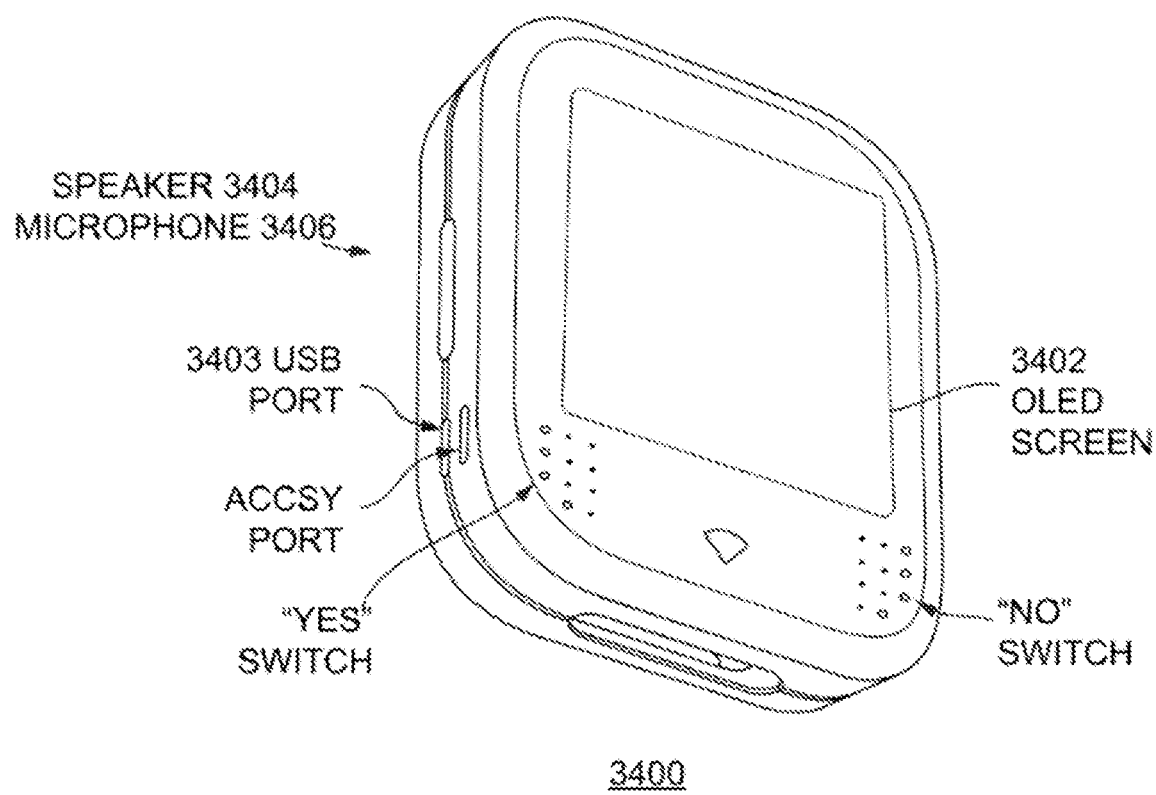
FIG. 10A is a perspective view of a smart pill case in the form of a smartwatch module, according to yet other various embodiments of the present invention.
Figure 10B:
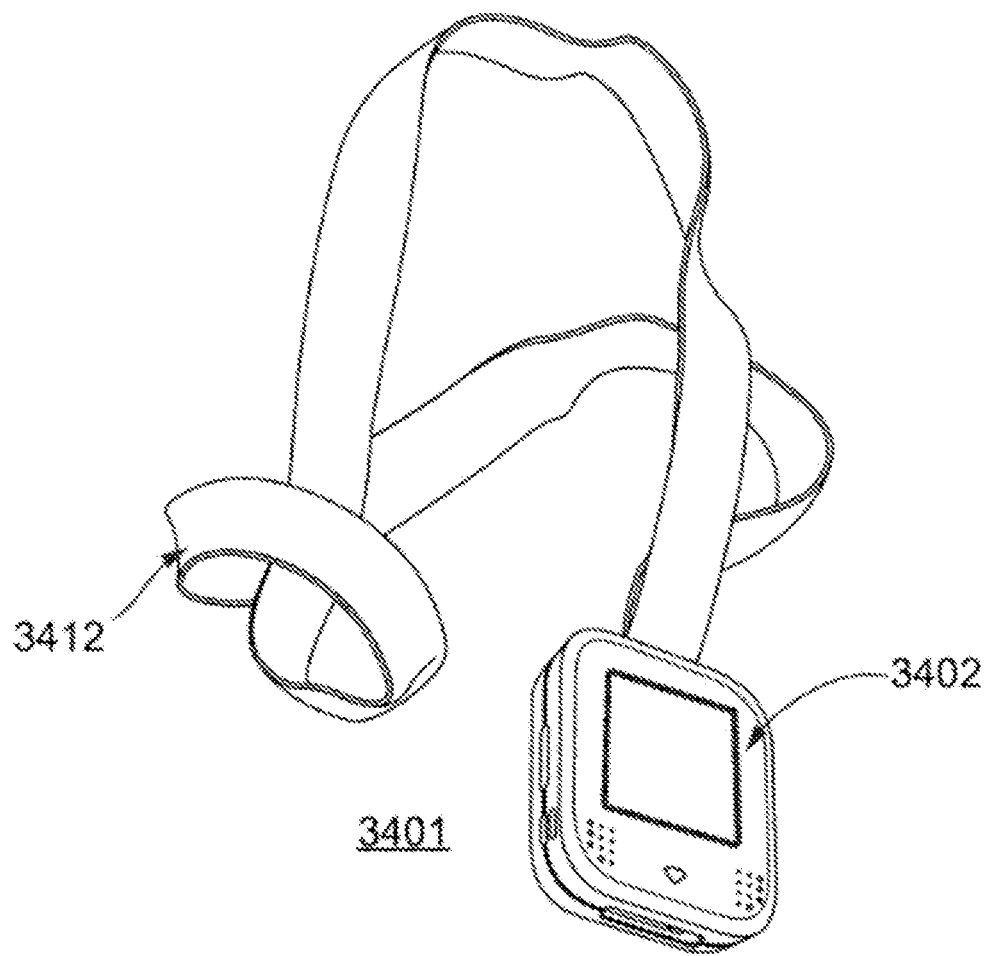
FIG. 10B is a perspective view of the smartwatch module shown in FIG. 10A, tethered to a lanyard.
Figure 10C:
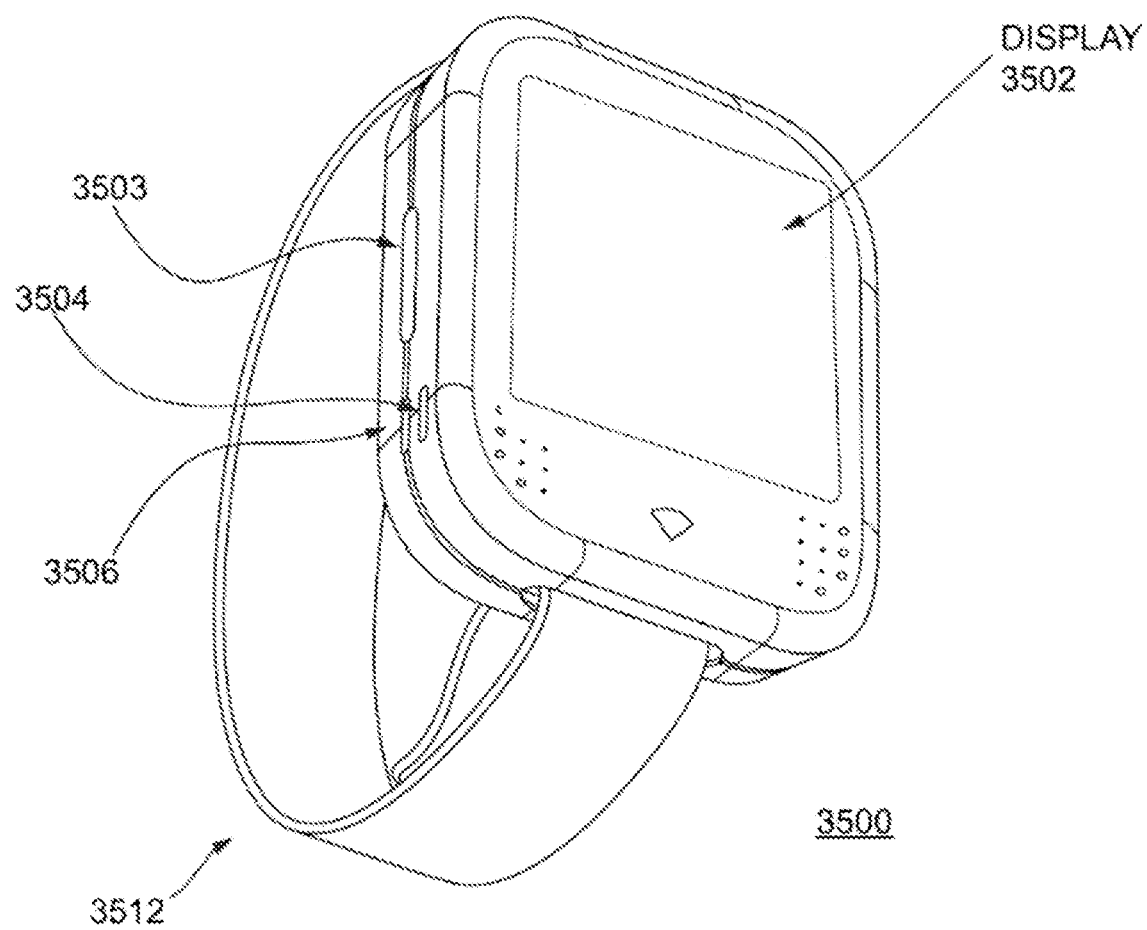
FIG. 10C is a perspective view of the smartwatch module shown in FIG. 10A, fixed to a watchband.

FIG. 10A is a perspective view of a smart pill case in the form of a smartwatch module, according to yet other various embodiments of the present invention. FIG. 10B is a perspective view of the smartwatch module shown in FIG. 10A, tethered to a lanyard. FIG. 10C is a perspective view of the smartwatch module shown in FIG. 10A, fixed to a watchband.

Although accelerometer 924 can be included in smartwatch 900 shown in FIG. 9, additional or alternative motion sensors can instead be used. For example, an electronic heading sensor can be incorporated such as a solid-state device that combines a 3-axis magnetometer with a 3-axis accelerometer and a rate gyroscope. Such a sensor can be integrated with a processor for establishing magnetic heading even when the magnetometer is not level with the horizon. The heading sensors can also be configured to report turns and tilts.

MEMS-based motion sensors can be used that include an accelerometer and a gyroscope. An accelerometer can be used to measure linear acceleration. The physical mechanisms underlying MEMS-based accelerometers include capacitive, piezoresistive, electromagnetic, piezoelectric, ferroelectric, optical and tunneling. MEMS-based accelerometers can be simple devices consisting of a cantilever beam with a predetermined test mass (also known as proof mass seismic mass). Under the influence of external accelerations, the mass deflects from its neutral position. This deflection is measured in an analog or digital manner. Commonly, the capacitance between a set of fixed beams and a set of beams attached to the proof mass is measured. MEMS-based accelerometers generally operate in-plane, that is, they are designed to be sensitive only to a direction of the plane of a die. By integrating two devices perpendicularly on a single die, a two-axis accelerometer can be made. By adding an additional out-of-plane device, three axes can be measured. Accelerometers with integral electronics offer readout electronics and self-test capability.

A compass can be used for determining direction relative to the earth's magnetic pole. It consists of a magnetized pointer free to align itself with the earth's magnetic field. Miniature compasses are usually built out of two or three magnetic field sensors, for example Hall sensors, that provide data for a microprocessor. The correct heading relative to the compass is calculated using trigonometry. Often, a miniature compass is a discrete component which outputs either a digital or analog signal proportional to its orientation. This signal is interpreted by a controller or microprocessor. The compass can use highly calibrated internal electronics to measure the response of the compass to the earth's magnetic field. Examples of miniature compasses available in the marketplace include the HMC1051Z single-axis and the HMC1052 two-axis magneto-resistive sensors sold by Honeywell International Inc., the AK8973 3-axis electronic compass sold by Asahi Kasei Microdevices Corporation, and the AMI 201 (2-axis) and the AMI 302 (3-axis) electronic compass modules sold by Aichi Micro Intelligent Corporation of Japan.

A gyroscope can be incorporated for measuring or maintaining orientation, based on the principles of conservation of angular momentum. MEMS-based gyroscopes use vibrating proof masses. Those masses typically vibrate at a high frequency. As the sensor housing rotates in inertial space a Coriolis force is induced on the proof mass. The Coriolis force causes a vibration in an orthogonal plane and the amplitude of the orthogonal motion can be measured. This type of device is also known as a Coriolis vibratory gyro because as the plane of oscillation is rotated, the response detected by the transducer results from the Coriolis term in its equations of motion ("Coriolis force"). A vibrating structure gyroscope can be implemented as a tuning fork resonator, a vibrating wheel, or a wine glass resonator using MEMS technology.

Accelerometers, compasses, and gyroscopes can be used to detect movement when a direction or speed of movement changes and are termed more generally as a class, "movement sensors" or "heading sensors", and are contrasted with the more limited motion sensors that rely strictly on accelerometry.

Other sensors that can be sued with the smartwatches and other smart pill cases described herein include radio devices designed to detect radio traffic, such as a "ping" from a proximate radio device. Such sensors can detect received radio signal strength. Other sensors that can be used include GPS sensors having a function of fixing a location in present time, and can by combined with other data, for example, by registering a radio contact such that a sensor datum with a time stamp and a geostamp can be generated. Sensor or location data can be sent in real time without timestamp by the transmitting device, or can be recorded in a memory with a timestamp for later transmission. Sensor data can be stored in a rolling sensor data log.

FIGS. 10A and 10B show a smart pill case 3400 that includes an OLED display screen for video graphics, shown here as a color OLED screen with sufficient pixel resolution to display QR codes, emojis, icons, faces, and simplified text. The body includes a shell surrounding a hollow core for the electronics. Smart pill case 3400 includes an OLED screen display 3402, with miniport 3403 for USB-A recharging, and optionally an accessory USB-C or HDMI port can be included. The face includes pressure sensitive pads for button press commands.

For setup, smart pill case 3400 can have a peel-off decal with QR Code over the OLED screen. The initial setup can be relatively easy. Each smart pill case can be provided with a QR code label on the housing. Scanning the code with a companion smartphone or smart dive (once software is installed) causes a folder to be created on the smartphone display and takes the user to a menu for assigning the smart pill case to a particular person (such as a patient), and entering any context or relevant background such as a profile, a medications list, a medication reminder calendar, a schedule of regular destinations, time brackets for each, and the like. Once programmed, the smart pill case is electronically tethered to the smartphone via a VPG. The smartphone can direct text messages to the smart pill case, or can even call the smart pill case using VOW cellular service. Immediately after setup, the smart device can also display a map showing the current location of the smart pill case and any direction of movement (if the circuit in the device includes, for example, an accelerometer).

The transparent QR decal can include a first QR Code that is static, and when the device is powered up, other details of the QR Code can be added, so that a smartphone that is used to read the QR code will see a first authentication code prior to power-on and a second authentication code after power on, as a way of preventing counterfeiting. Devices are provided with SIM cards inside and a QR sticker outside, and the initial pairing can be through BT radio of a user's smartphone. The QR code directs the user's smartphone to a cloud host, the cloud host will recognize the new SIM IMSI and will go through an activation setup in which BT commands are sent to the device processor via the BT radio. Subscription cellular network access can be bundled at very low cost, enabling private virtual gateways (VPG) in which network access is gated through a private IP Address and all packeted data is routed to a private server.

The battery for smart pill case 3400 can be, for example, a 2400 mAh battery. An NFC antenna can be mounted on the underside of the battery, and the battery can be a LiPo foil pouch battery. The NFC antenna can be used for tap-to-touch pairing, for example, and for exchanging secret keys using direct contact, to ensure lack of eavesdropping.

The shell exterior supports ports for a speaker 3404 and microphone 3406. Yes and No button switches and a radio display LED are also mounted in the housing. The housing can include an interior speaker that causes the housing to resonate for voice and buzzer applications. Several antennae can be embedded in the housing, including, for example, one for BLUETOOTH and another for cellular radio. There can be multiple antennae for cellular radio on different frequency bands, or the antennae can be articulated to allow use at multiple frequencies for receiving and transmission.

As shown in FIG. 10B, smart pill case 3400 (FIG. 10A) has been tethered to a lanyard to form a device 3401. In this regard, smart pill case 3400 is perforated with a slot for a lanyard or belt 3412. Other means for attaching smart pill case 3400 to an asset are known in the art. The attachment hardware can be adapted to use for attaching the device to a belt, purse strap, pocket, or the like. The device includes buckles for use on a lanyard and an OLED display 3402 with microphone and speaker for audiovisual communications as well as data logging.

FIG. 10C is a view of a smart pill case 3500 that is similar to smart pill case 3400 shown in FIG. 10A, but smart pill case 3500 includes a wrist strap 3512 and can function as a location and wayfinding monitor and messaging center. The device has voice and display capability for cellular and BT voice and data networking, and incorporates a speaker 3503 and display 3502. The circuitry includes a microphone, voice encoder for voice transmission, and tactile buttons as part of a voice and touch user interface. Separate audio codecs are supplied for higher quality. The chipset can include a Monarch controller (Sequans, Paris FR) with integrated LTE modem. RAM memory for use in data logging is adapted as a buffer for audio/video transmission or separate memory and buffering is provided. Options can include a Satnav positioning module and a recharging circuit with external power supply, which can include, for example, a connector for a USB power cord. The device can also include a DSP for recognizing voice patterns, but voice recognition interfaces can be provided as a system service and implemented on a system level, as opposed to extra hardware that must be supported onboard the device. In an exemplary embodiment, a CEVA (Mountain View, California) BLUETOOTH BTLE or BTDM RF front end is combined with a Monarch (Sequans, Paris FR) cellular modem in which the BT radio controls the power state of both chips via the processor. In another example, an AeroFONE single-chip core from NPX Semiconductor can be combined with BT radio. USB ports 3504, 3506 can be configured for power connections, data connections, or both.

The display 3502 on a device such as smart pill case 3500 enables mixed media communication on a small screen. By also including a camera (not shown), higher functions (such as recognition of QR codes, biometric security features, and capturing photographs or videos) can be enabled. Energy and buffering requirements for broadband capture, storage, or transmission of images can be provided even in smaller smart pill cases. Devices without a camera can be simplified to operate on a lower energy budget but to supply a powerful tool for communicating with and providing reminders to a user. The kinds of data that can be sent to a device with a display include, for example, QR codes that can be read by remote machines, text messages, machine-readable icons, pictures of faces, statistics, biographical information, biometrics, emojis that accompany voice messages, maps, directions, instructions in graphical form, animations, plots, graphs, decorative images, and so forth, any of which can be presented on a display screen without a need for a camera and associated processing power. An NFC antenna on the underside adds the capacity for Tap-to-Pay and Tap-to-Connect. Qi charging can also be implemented. Devices of this kind are described further in U.S. Pat. No. 11,450,196 B2, which is incorporated herein by reference in its entirety. An augmented reality system can be incorporated into the device or elsewhere in the system to add to a display features, for example, an illusion or projected image of a pharmacy, an illusion or projected image of the pill case or its contents, and the like. The display can additionally, or instead, include a display screen built into glasses, for example, a smart-glasses display or a smart goggles display.

The present invention can include any combination of the various features and embodiments described herein. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, a preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A pill case and medication reminder system, comprising a wearable pill case, a reminder system in data transfer communication with the wearable pill case, an accelerometer in data transfer communication with the reminder system, a timer configured to generate a timing signal, and a memory having a meal-time time range stored therein, wherein:

the wearable pill case comprises a compartment configured to hold a medication, a sensor configured to detect the amount of medication in the wearable pill case, a pill case processor configured to generate a data signal pertaining to the amount of medication in the wearable pill case, and a pill case transmitter configured to transmit the data signal to the reminder system;

the accelerometer is built into the wearable pill case and comprises an accelerometer sensor, an accelerometer processor, and an accelerometer transmitter, the accelerometer sensor being configured to sense acceleration of motion of the reminder system, the accelerometer processor being configured to generate an accelerometric signal based on the sensed acceleration of motion, and the accelerometer transmitter being configured to transmit the accelerometric signal to the reminder system;

the reminder system comprises at least one receiver and a system processor, the at least one receiver being configured to receive the data signal from the pill case transmitter and to receive the accelerometric signal from the accelerometer, and the system processor being programmed to generate alerts pertaining to the medication, based on the data signal and the accelerometric signal; and the system processor is programmed to generate an alert based on the timing signal and based on the accelerometric signal when the timing signal and the accelerometric signal indicate that the wearable pill case is moving in an eating gesture during the meal-time time range.

2. The pill case and medication reminder system of claim 1, wherein the reminder system comprises a software program stored on a smartphone.

3. The pill case and medication reminder system of claim 2, wherein the wearable pill case comprises a phone case for the smartphone.

4. The pill case and medication reminder system of claim 1, wherein the reminder system comprises a software program stored on a smartwatch.

5. The pill case and medication reminder system of claim 1, further comprising a global positioning system including a positioning processor, wherein the positioning processor is configured to compare a position coordinate signal with a map database, and to determine a proximity of the global positioning system to (1) a restaurant or restaurant district, (2) a drugstore or pharmacy, (3) a home, or (4) a combination of (1), (2), and (3).

6. The pill case and medication reminder system of claim 5, wherein the system processor is configured to generate a medication reminder alert when the accelerometric signal indicates that the reminder system and the accelerometer are moving in an eating gesture.

7. The pill case and medication reminder system of claim 5, wherein the system processor is configured to generate a low inventory alert when the data signal pertaining to the amount of medication in the wearable pill case indicates that the amount of medication in the wearable pill case is below a predetermined level, and the position coordinate signal indicates that the global positioning system is within 2500 feet of a drug store or pharmacy.

8. The pill case and medication reminder system of claim 1, wherein the system processor is configured to generate a medication reminder alert when the accelerometric signal indicates that the reminder system and accelerometer are moving in an eating gesture.

9. The pill case and medication reminder system of claim 1, wherein the reminder system further comprises a timer, the pill case processor is further configured to generate a timing signal pertaining to a time when an amount of medication is removed from the wearable pill case, the system processor is configured to generate a first medication reminder alert at a first time of day, and the reminder system is configured to cancel the first medication reminder alert when the timing signal indicates that the medication has been timely taken prior to the first time of day.

* * * * *